United States Patent
High et al.

(10) Patent No.: US 12,448,440 B2
(45) Date of Patent: Oct. 21, 2025

(54) COMPOSITIONS COMPRISING ANTIBODIES OR ANTIBODY FRAGMENTS WHICH BIND THE P2X4 RECEPTOR

(71) Applicants: UNM Rainforest Innovations, Albuquerque, NM (US); LOYOLA UNIVERSITY OF CHICAGO, Maywood, IL (US)

(72) Inventors: Karin Westlund High, Albuquerque, NM (US); Ravi Venkata Durvasula, Albuquerque, NM (US); Adinarayana Kunamneni, Albuquerque, NM (US)

(73) Assignees: LOYOTA UNIVERSITY OF CHICAGO, Maywood, IL (US); UNM Rainforest Innovations, Albuquerque, NM (US)

( * ) Notice: Subject to any disclaimer, the term of this patent is extended or adjusted under 35 U.S.C. 154(b) by 913 days.

(21) Appl. No.: 17/637,350

(22) PCT Filed: Aug. 21, 2020

(86) PCT No.: PCT/US2020/047360
§ 371 (c)(1),
(2) Date: Feb. 22, 2022

(87) PCT Pub. No.: WO2021/041194
PCT Pub. Date: Mar. 4, 2021

(65) Prior Publication Data
US 2022/0298238 A1 Sep. 22, 2022

Related U.S. Application Data

(60) Provisional application No. 62/890,879, filed on Aug. 23, 2019.

(51) Int. Cl.
*C07K 16/28* (2006.01)
*A61P 29/00* (2006.01)

(52) U.S. Cl.
CPC ............ *C07K 16/28* (2013.01); *A61P 29/00* (2018.01); *C07K 2317/565* (2013.01); *C07K 2317/622* (2013.01)

(58) Field of Classification Search
CPC ............ C07K 16/28; C07K 2317/565; C07K 2317/622; A61P 29/00; A61K 2039/505
See application file for complete search history.

(56) References Cited

U.S. PATENT DOCUMENTS

| | | | |
|---|---|---|---|
| 8,877,898 B2 | 11/2014 | Markiv et al. | |
| 12,145,991 B2 | 11/2024 | Westlund High et al. | |
| 2004/0001842 A1 | 1/2004 | Michaeli et al. | |
| 2006/0134109 A1 | 6/2006 | Gaitanaris et al. | |
| 2016/0207991 A1 | 7/2016 | Bloom et al. | |
| 2017/0166634 A1 | 6/2017 | Williams et al. | |
| 2021/0340265 A1 | 11/2021 | Westlund High et al. | |
| 2025/0059273 A1 | 2/2025 | High et al. | |

FOREIGN PATENT DOCUMENTS

| | | |
|---|---|---|
| CN | 115244082 A | 10/2022 |
| JP | 2017515473 A | 6/2017 |
| WO | WO-2016034968 A1 | 3/2016 |
| WO | WO-2020092883 A1 | 5/2020 |
| WO | WO-2021041194 A1 | 3/2021 |
| WO | 2023114962 | 6/2023 |

OTHER PUBLICATIONS

"European Application Serial No. 20856069.8, Extended European Search Report mailed Aug. 9, 2023", 6 pgs.
"U.S. Appl. No. 17/284,208, Notice of Allowability mailed Oct. 17, 2024", 2 pgs.
"U.S. Appl. No. 18/720,191, Supplemental Preliminary Amendment filed Oct. 31, 2024", 3 pgs.
"Japanese Application Serial No. 2022-512748, Examiners Decision of Final Refusal mailed Jan. 21, 2025", w/o English translation, 1 page.
"European Application Serial No. 20856069.8, Response Filed Oct. 25, 2022 to Communication Pursuant to Rules 161(2) and 162 EPC mailed Jun. 1, 2022", 3 pgs.
"International Application Serial No. PCT/US2020/047360, International Preliminary Report on Patentability mailed Mar. 3, 2022", 5 pgs.
"International Application Serial No. PCT/US2022/081741, International Search Report mailed May 3, 2023", 5 pgs.

(Continued)

*Primary Examiner* — Robert S Landsman
(74) *Attorney, Agent, or Firm* — Schwegman, Lundberg & Woessner, P.A.

(57) ABSTRACT

A composition for treating pain includes an antibody or antibody fragment that specifically binds to a receptor involved in pain. In some embodiments, the receptor is a P2X family receptor such as, for example, P2X4. In some embodiments, the antibody includes a detectable marker. In some of these embodiments, the detectable marker includes a fluorescent tag. The composition may be used to treat acute or chronic pain in a subject. Generally, the methods includes administering to the subject a composition that includes an antibody or antibody fragment that specifically binds to a receptor involved in pain. The non-opioid pain relief composition can reverse pain related mechanical, cold, anxiety-like, and depression-like behaviors in neuropathic pain and chemotoxic nerve injury models.

6 Claims, 15 Drawing Sheets

Specification includes a Sequence Listing.

(56) References Cited

OTHER PUBLICATIONS

"International Application Serial No. PCT/US2022/081741, Written Opinion mailed May 3, 2023", 6 pgs.

Anderson, Leigh, et al., "Inflammatory hypersensitivity in a rat model of trigeminal neuropathic pain (abstract)", Arch Oral Biol. 48(2), pp. 161-169. doi: 10.1016/s0003-9969(02)00203-0. PMID: 12642236, (2003), 1 pg.

Bennett, Gary, et al., "A peripheral mononeuropathy in rat that produces disorders of pain sensation like those seen in man", Pain, 33, (1988), 87-107.

Chaplan, S. R., et al., "Quantitative assessment of tactile allodynia in the rat paw", Journal of Neuroscience Methods, 53, (1994), 55-63.

Decosterd, Isabelle, et al., "Spared nerve injury: an animal model of persistent peripheral neuropathic pain", Pain, 87, (2000), 149-158.

Ding, W, et al., "An Improved Rodent Model of Trigeminal Neuropathic Pain by Unilateral Chronic Constriction Injury of Distal Infraorbital Nerve (abstract)", J Pain., 18(8), pp. 899-907. doi: 10.1016/j.jpain. 2017.02.427. PMID: 28238950; PMCID: PMC5537008., (2017), 1 pg.

Dutta, Sulagna, et al., "Men and mice: Relating their ages (abstract)", Life Sci., 152, pp. 244-248. doi: 10.1016/j.lfs.2015.10.025. PMID: 26596563., (May 2016), 1 pg.

File, Sandra, et al., "Animal tests of anxiety (abstract)", Curr Protoc Pharmacol. Chapter 5, Unit 5.38. doi: 10.1002/0471141755. ph0538s27. PMID: 22294128, (2005), 1 pg.

Igawa, Tatsuhiro, et al., "Preparation and characterization of a monoclonal antibody against the refolded and functional extracellular domain of rat P2X4 receptor", The Journal of Biochemistry, vol. 153, issue 3, (2013), 275-282.

Imamura, Y, et al., "Characterization of heat-hyperalgesia in an experimental trigeminal neuropathy in rats (abstract)", Characterization of heat-hyperalgesia in an experimental trigeminal neuropathy in rats. Exp Brain Res., 116(1), pp. 97-103. doi: 10.1007/pl00005748. PMID: 9305818., (Aug. 1997), 1 pg.

Kozakov, Dima, et al., "PIPER: an FFT-based protein docking program with pairwise potentials (abstract)", Proteins. 65(2), pp. 392-406. doi: 10.1002/prot.21117. PMID: 16933295., (Nov. 2006), 1 pg.

Kunamneni, A, et al., "Generating highly potent and efficacious antibodies to the cholecystokinin B (CCK-B) receptor by ribosome display for the treatment of neuropathic pain (abstract)", Pharmacology, vol. 33, Issue S1. This abstract is from the Experimental Biology 2019 Meeting. There is no full text article associated with this abstract published in The FASEB Journal., (Apr. 2019), IB31-IB31.

Kunamneni, A, et al., "Generation and Selection of a Panel of Pan-Filovirus Single-Chain Antibodies using Cell-Free Ribosome Display", Am. J. Trop. Med. Hyg., 101(1), (2019), 198-206.

Kunamneni, A, et al., "Ribosome display for the rapid generation of high-affinity Zika-neutralizing single-chain antibodies", PLoS ONE 13(11);e205743, (2018), 1-13.

Kunamneni, Adinarayana, et al., "Therapeutic anti-P2X4 receptor scFv antibody for chronic neuropathic pain", The FASEB Journal, vol. 34, issue S1, (Apr. 18, 2020), 3 pgs.

Lyons, D N, "Trigeminal Inflammatory Compression (TIC) injury induces chronic facial pain and susceptibility to anxiety-related behaviors (abstract)", Neuroscience, 295, pp. 126-138, (2015), 1 pg.

Lyons, Danielle, et al., "Combination Drug Therapy of Pioglitazone and D-cycloserine Attenuates Chronic Orofacial Neuropathic Pain and Anxiety by Improving Mitochondrial Function Following Trigeminal Nerve Injury (abstract)", Clin J Pain, 34(2), pp. 168-177, (Feb. 2018), 2 pgs.

Ma, F, et al., "DYSREGULATED TNFa Promotes Cytokine Proteome Profile Increases and Bilateral Orofacial Hypersensitivity", Neuroscience, 300, pp. 493-507, (2015), 29 pgs.

Ma, F, et al., "Orofacial neuropathic pain mouse model induced by Trigeminal Inflammatory Compression (TIC) of the infraorbital nerve", Mol Brain., 5(44), (2012), 1-11.

Mamet, Julien, et al., "Single intrathecal administration of the transcription factor decoy AYX1 prevents acute and chronic pain after incisional, inflammatory, or neuropathic injury (abstract)", Pain 155(2), pp. 322-333, (Feb. 2014), 1 pg.

Montera, Marena, et al., "Minimally Invasive Oral Surgery Induction of the FRICT-ION Chronic Neuropathic Pain Model", Bio Protoc., 10(8), e3591. doi: 10.21769/BioProtoc.3591, (2020), 1-15.

Okubo, M, et al., "Transition to persistent orofacial pain after nerve injury involves supraspinal serotonin mechanisms", J Neurosci., 33(12):. doi: 10.1523/JNEUROSCI.3390-12.2013, (2013), 5152-61.

Samuels, David, "Neurogenesis-dependent and -independent effects of fluoxetine in an animal model of anxiety/depression (abstract)", Neuron., 62(4), pp. 479-493. doi:10.1016/j.neuron.2009.04.017, (2009), 1 pg.

Seltzer, Z, et al., "A novel behavioral model of neuropathic pain disorders produced in rats by partial sciatic nerve injury (abstract)", Pain, 43, pp. 245-250, (1990), 1 pg.

Shields, Shannon, et al., "Spared nerve injury model of neuropathic pain in the mouse: a behavioral and anatomic analysis (abstract)", J Pain, 4(8), pp. 465-470, (Oct. 2003), 1 pg.

Tall, Jill, et al., "Dietary constituents as novel therapies for pain", Clin J Pain., 20(1), (2004), 19-26.

Tang, Y, et al., "Modeling Pharmacokinetics and Pharmacodynamics of Therapeutic Antibodies: Progress, Challenges, and Future Directions", Pharmaceutics, 13, 422, (2021), 1-28.

Vigil, J M, et al., "The Therapeutic Effectiveness of Full Spectrum Hemp Oil Using a Chronic Neuropathic Pain Model", Life, 10(5),69, (2020), 1-12.

Vos, B P, et al., "Behavioral evidence of trigeminal neuropathic pain following chronic constriction injury to the rat's infraorbital nerve", J Neurosci., 14(5), (May 1994), 2708-2723.

Wallace, A C, "LIGPLOT: a program to generate schematic diagrams of protein-ligand interactions (abstract)", Protein Eng., 8(2), pp. 127-134. doi: 10.1093/protein/8.2.127., (1995), 1 pg.

Westlund, K N, et al., "Single-chain Fragment variable antibody targeting cholecystokinin-B receptor for pain reduction", Neurobiology of Pain 10, 100067, (2021), 1-15.

Wiley, R G, et al., "Anti-nociceptive effects of selectively destroying substance P receptor-expressing dorsal horn neurons using [Sar9,Met(O2)11]-substance P-saporin: behavioral and anatomical analyses (abstract)", Neuroscience., 146(3), pp. 1333-1345. doi: 10.1016/j.neuroscience.2007.01.066, (May 2007), 1 pg.

Williams, Wendy, et al., "Antibodies binding the head domain of P2X4 inhibit channel function and reverse neuropathic pain", Pain, vol. 160, No. 9, (2019), 1989-2003.

Xu, Dong, et al., "Improving the Physical Realism and Structural Accuracy of Protein Models by a Two-Step Atomic-Level Energy Minimization", Biophysical Journal, vol. 101, (Nov. 2011), 2525-2534.

Xu, M, et al., "Partial infraorbital nerve ligation as a model of trigeminal nerve injury in the mouse: behavioral, neural, and glial reactions", J Pain., 9(11, pp. 1036-1048, (2008), 23 pgs.

Yalcin, I, et al., "A time-dependent history of mood disorders in a murine model of neuropathic pain (abstract)", Biol Psychiatry, 70(10), pp. 946-953. doi: 10.1016/j.biopsych.2011.07.017., (2011), 2 pgs.

Yalcin, I, et al., "The sciatic nerve cuffing model of neuropathic pain in mice", J Vis Exp., (89):51608, (2014), 1-7.

Yang, J, et al., "Template-based protein structure prediction in CASP11 and retrospect of I-Tasser in the last decade", Proteins, 84(Suppl 1), pp. 233-246, (Sep. 2016), 26 pgs.

Zhang, J, et al., "Atomic-level protein structure refinement using fragment-guided molecular dynamics conformation sampling", Structure, 19(12), pp. 1784-1795, (2011), 24 pgs.

Zhu, "Antibody structure determination using a combination of homology modeling, energy-based refinement, and loop prediction", Proteins, 82(8), pp. 1646-1655., (2014), 20 pgs.

"U.S. Appl. No. 17/284,208, Non Final Office Action mailed Feb. 14, 2024", 16 pgs.

"U.S. Appl. No. 17/284,208, Notice of Allowance mailed Jul. 17, 2024", 8 pgs.

(56) References Cited

OTHER PUBLICATIONS

"U.S. Appl. No. 17/284,208, Response filed Apr. 26, 2024 to Non Final Office Action mailed Feb. 14, 2024", 6 pgs.
"European Application Serial No. 20856069.8, Response Filed Feb. 29, 2024 to Extended European Search Report mailed Aug. 9, 2023", 8 pgs.
"GeneCards: CCKBR Gene", GASR Protein—GASR Antibody, [Online]. Retrieved from the Internet: <URL: hllps://www.genecards.org/cgi-bin/carddisp.pl?gene=CCKBR>, (2024), 29 pgs.
"International Application Serial No. PCT/US2022/081741, International Preliminary Report on Patentability mailed Jun. 27, 2024", 8 pgs.
"Japanese Application Serial No. 2022-512748, Notification of Reasons for Refusal mailed Jul. 23, 2024", w/ English translation, 8 pgs.
Campbell, et al., "A monomeric red fluorescent protein, A monomeric red fluorescent protein", Proc Natl Acad Sci USA 99(12), (Jun. 11, 2002), 6 pgs.
Malhotra, Arun, "Chapter 16: Tagging for Protein Expression", Methods in Enzymology, vol. 463, (2009), 239-258.
Yin, et al., "Transcriptomic and behavioral characterization of a mouse model of burn pain identify the cholecystokinin 2 receptor as an analgesic target", Mol Pain, vol. 12: 1-13, (2016), 13 pgs.
"U.S. Appl. No. 17/284,208, Preliminary Amendment filed Apr. 9, 2021", 6 pgs.
"International Application Serial No. PCT/US2019/059366, International Preliminary Report on Patentability mailed Apr. 27, 2021", 6 pgs.
"International Application Serial No. PCT/US2019/059366, International Search Report mailed Feb. 13, 2020", 4 pgs.
"International Application Serial No. PCT/US2019/059366, Written Opinion mailed Feb. 13, 2020", 5 pgs.
"International Application Serial No. PCT/US2020/047360, International Search Report mailed Nov. 19, 2020", 2 pgs.
"International Application Serial No. PCT/US2020/047360, Written Opinion mailed Nov. 19, 2020", 3 pgs.
Bertoglio, Leandro Jose, "Involvement of dorsolateral periaqueductal gray cholecystokinin-2 receptors in the regulation of a panic-related behavior in rats", Brain Res. 1059, (Oct. 12, 2005), 46-51.
Ghilardi, Joseph R, et al., "Trigeminal and Dorsal Root Ganglion Neurons Express CCK Receptor Binding Sites in the Rat, Rabbit, and Monkey: Possible Site of Opiate-CCK Analgesic Interactions", Journal of Neuroscience 12(12), (Dec. 1992), 4854-4866.
Tohidkia, Mohammad R, et al., "Selection of Potential Therapeutic Human Single-Chain Fv Antibodies against Cholecystokinin-B/Gastrin Receptor by Phage Display Technology". BioDrugs 27, (Feb. 2013), 55-67.
Yin, Kathleen, et al., "Transcriptomic and behavioural characterisation of a mouse model of burn pain identify the cholecystokinin 2 receptor as an analgesic target", Mol Pain 12, (Aug. 28, 2016), 1-13.

(A)

(B)

(A)

(B)

(C)

COMPOSITIONS COMPRISING ANTIBODIES OR ANTIBODY FRAGMENTS WHICH BIND THE P2X4 RECEPTOR

CROSS-REFERENCE TO RELATED APPLICATION

This application is a U.S. National Stage Filing under 35 U.S.C. 371 from International Application No. PCT/US2020/047360, filed Aug. 21, 2020, and published as WO 2021/041194 on Mar. 4, 2021, which application claims the benefit of U.S. Provisional Patent Application No. 62/890,879, filed Aug. 23, 2019, which is incorporated herein by reference in its entirety.

GOVERNMENT FUNDING

This invention was made with government support under DE028096 awarded by the National Institutes of Health and CP190116 awarded by the department of Defense. The government has certain rights in the invention.

SUMMARY

This disclosure describes, in one aspect, a composition that includes an antibody or antibody fragment that specifically binds to a receptor involved in pain, and a pharmaceutically acceptable carrier.

In some embodiments, the antibody or antibody fragment specifically binds to a P2X family receptor. In some of these embodiments, the P2X family receptor is P2X4.

In some embodiments, the antibody includes at least one complementarity determining region (CDR) of SEQ ID NO:1. In some of these embodiments, the CDR includes amino acids 28-35, amino acids 56-58, amino acids 102-112, amino acids 177-183, amino acids 201-203, or amino acids 242-247 of SEQ ID NO:1.

In some embodiments, the antibody includes at least one complementarity determining region (CDR) of SEQ ID NO:2. In some of these embodiments includes amino acids 28-34, amino acids 55-60, amino acids 104-112, amino acids 171-177, amino acids 195-197, or amino acids 236-241 of SEQ ID NO:2.

In some embodiments, the antibody can further include a detectable marker. In some of these embodiments, the detectable marker includes a fluorescent tag.

In another aspect, this disclosure describes a method of treating acute or chronic pain in a subject. Generally, the method includes administering to the subject any embodiment of the composition summarized above in an amount effective to reduce pain in the subject.

The above summary is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
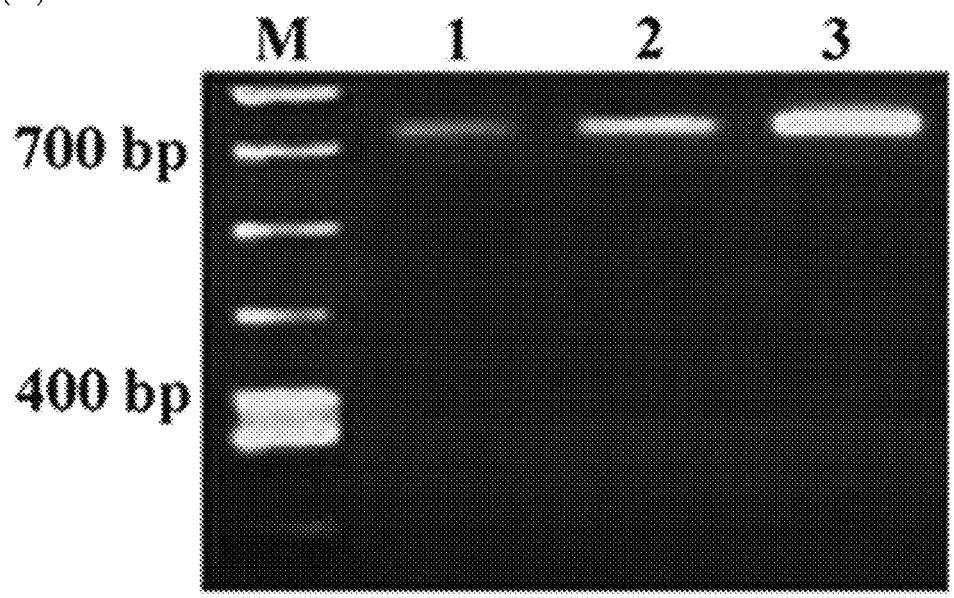
FIG. 1. P2X4 scFv antibody characterization. (A) Analysis of RT-PCR recovery of $V_H$/K cDNA from P2X4-immunized spleens in the first, second, and third cycles. (B) Western blot of three unique purified anti-P2X4 scFvs generated by ribosomal display.

Many suffering from chronic pain are ineffectively treated by current therapies. Opioids are limited by their serious side effects, such as, for example, sedation, respiratory depression, constipation, tolerance, and opioid dependence. Therefore, effective and specific non-opioid therapeutics fewer side effects for chronic pain are needed.

This disclosure describes non-opioid therapeutics for chronic pain. Specifically, this disclosure describes the production and use of antibodies directed against P2X4 as a non-opioid therapeutic option for treating chronic pain. P2X4 is a purinergic receptor that is expressed in central neurons, peripheral neurons, and microglia. P2X4 activation is sufficient to cause neuropathic pain mediated by microglia.

While described herein in the context of exemplary embodiments in which the antibody is an scFv, the antibody may be a full length antibody or any antibody fragment suitable for a given application. Thus, the antibody may be a full length monoclonal antibody; an engineered bispecific, trispecific, tetraspecific, etc. antibody; or any antibody fragment capable of binding to a biological molecule (such as an antigen or receptor) or a portion thereof. Suitable antibody fragments include, but are not limited to, a Fab, a Fab' a F(ab')$_2$, a pFc', a Fd, a single domain antibody (sdAb), a variable fragment (Fv), a single-chain variable fragment (scFv), a disulfide-linked Fv (sdFv), a diabody or a bivalent diabody, a linear antibody, a single-chain antibody molecule, or a multispecific antibody formed from antibody fragments. The antibody can be of any type (e.g., IgG, IgE, IgM, IgD, IgA and IgY), class (e.g., IgG1, IgG2, IgG3, IgG4, IgA1 and IgA2), or subclass. Finally, the antibody may be humanized.

Smaller engineered antibodies, such as scFvs (single-chain variable fragments), possess certain characteristics that make them useful alternatives to full-length immunoglobulins (e.g., conventional monoclonal antibodies): extreme specificity, brain penetrance, higher affinity, superior stability and solubility, reduced self-immunogenicity, and being easily and inexpensively produced in large-scale. Therapy based on small antibody format overcomes previous challenges of providing therapeutic applications for P2X and other receptors. The scFvs can be easily modified with an in vivo half-life for short-term diagnostic or long-term biotherapeutic applications for both the nervous and immune systems, now recognized as interactive in chronic pain. These qualities make scFv antibodies well suited for selective targeting of P2X4 and further development as chronic pain therapy, particularly since P2X4 is present in low levels under normal conditions and increases after nerve injury. As noted above, the scFvs can be readily humanized for administration to humans.

While described in the context of exemplary embodiments in which the scFvs were produced using in vitro ribosome display, the antibodies may be produced by any suitable method for producing antibodies known in the art. The ribosome display platform is, however, a powerful in vitro cell-free platform that generates peptide, protein, and antibody libraries with a diversity up to $10^{13-15}$, and no transformation is required. As a result, extremely high-affinity binders against a variety of targets can be isolated from the libraries. In particular, ribosome display antibody libraries can produce antibodies with picomolar affinity, the highest affinity ever achieved by an antibody production technology. Additional mutations can also be introduced into the gene by PCR.

The antibodies described herein can be readily modified to incorporate intrinsic fluorescence for in vivo imaging applications. Alternatively, the antibodies may be formulated into a pharmaceutical composition for use in therapeutic applications. This disclosure describes in vivo testing of a P2X4-specific scFv antibody therapy in animal models of chronic neuropathic pain and in vitro electrophysiological patch-clamp characterization of its effect.

The scFv antibody generated against P2X4 restores baseline pain-related and anxiety-related behavior and neuronal firing while reducing inflammatory mediators in chronic pain mouse models. The scFv antibodies were generated through ribosome display, characterized, and validated as previously described (Kunamneni et al., 2018, *PLoS ONE* 13(11):e0205743; Kunamneni et al., 2019, *Am. J. Trop. Med. Hyg.* 101(1):198-206).

Figure 7:
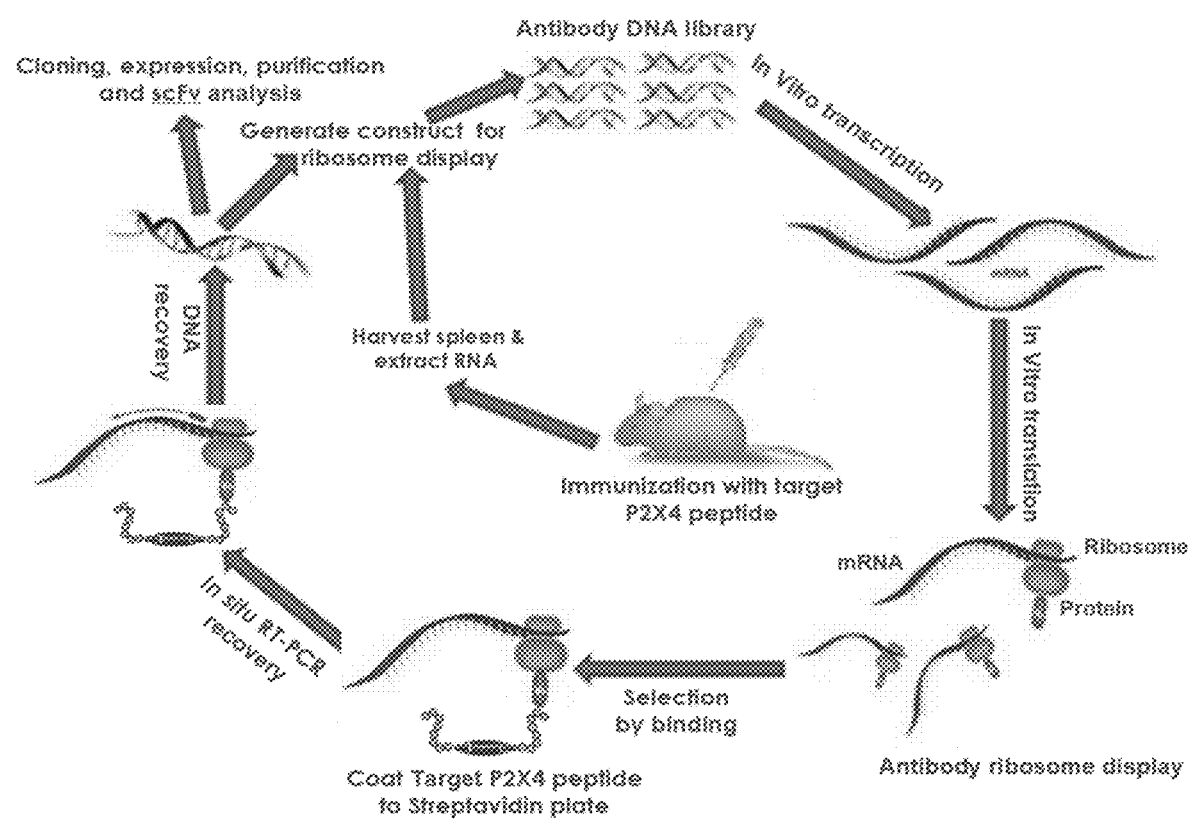
FIG. 7. Graphical overview of P2X4 scFv antibody generation. scFvs are generated using cell-free ribosome display from mice immunized against a P2X4 immunizing peptide fragment selected at the membrane binding region, followed by eukaryotic ribosome display selection, humanization, and affinity evolution. The DNA sequence encoding a P2X4R scFv of interest is subjected to diversification by targeted (site-directed) mutagenesis. The resulting library is converted to ribosome display format for transcription to mRNA, translation, and selection.

The scFv antibodies that block P2X4 in a mouse chronic pain model were generated using ribosome display. Total RNA was isolated from spleens of five mice immunized with a custom extracellular peptide sequence (amino acids 301-313) of rat P2X4 (C-RDLAGKEQRTLTK (SEQ ID NO:3), mol. wt. 1516 g/mol, with N terminal biotin tag, GenScript Biotech, Piscataway, NJ). The peptide has 11 of 13 amino acid residues that are identical to human P2X4. Twelve of 13 amino acid residues are identical to mouse P2X4. cDNA libraries encoding the immunoglobulin heavy and light chain variable regions ($V_H$ and $V_L$) were constructed for ribosome display. Three rounds of panning of the ribosome-displayed scFv library against the P2X4 receptor peptide were performed. PCR products cloned into pGEM-T vector were used to transform *E. coli* competent cells and about 100 clones of $V_H$-$V_L$ transformants were later randomly selected for sequencing (FIG. 7).

Figure 2:
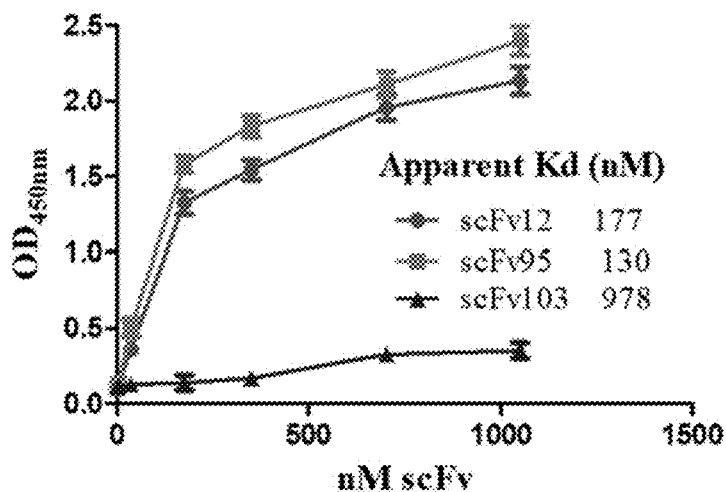
FIG. 2. P2X4 scFv antibody characterization. (A) Binding affinity of three P2X4 scFvs; scFv12, scFv95, and scFv103. (B) Binding specificity/cross-reactivity of three P2X4 scFvs to P2X4 receptor (P2X4R) (right bars). Positive binding controls with P2X4 scFv binding to P2X4 and CCKB scFv binding to CCKBR (four left bars). Negative control with no P2X4 scFv binding to CCKB, and no CCKBR scFv binding to P2X4 (middle four bars). (C) Western blot of medullary brain tissue from mice with neuropathic pain model (FRICT-ION) hypersensitivity (n=2, 10 wk), immunized with one of the two P2X4 scFvs, seven weeks prior. Bands for the P2X4 His-tag serve as an indicator of brain penetration provided by the single intraperitoneal dose of scFv that reverses hypersensitivity, depression-like behavior, and anxiety-like behavior. The smaller size of the scFv compared to a full IgG allows ease in crossing the blood-brain and blood nerve barriers that keep many molecules out. *$p<0.05$ ANOVA compared to naïve mice.
Figure 2:
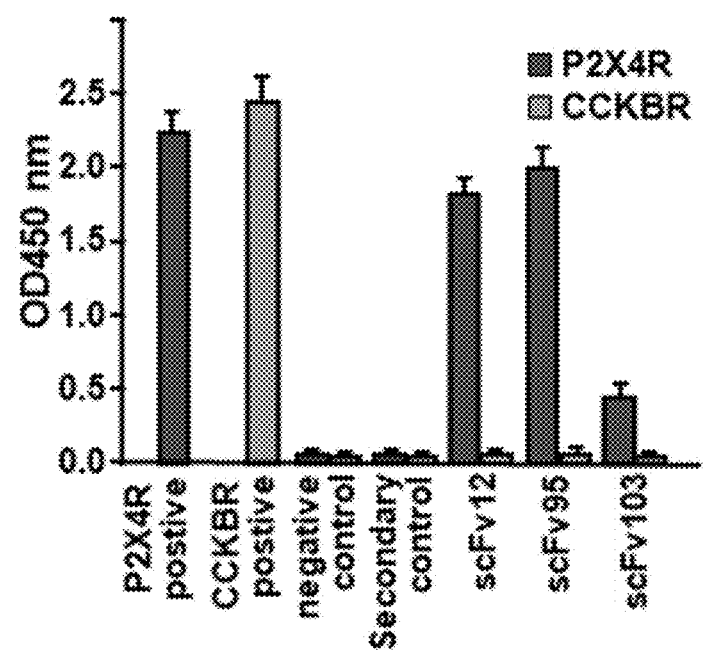
Figure 2:
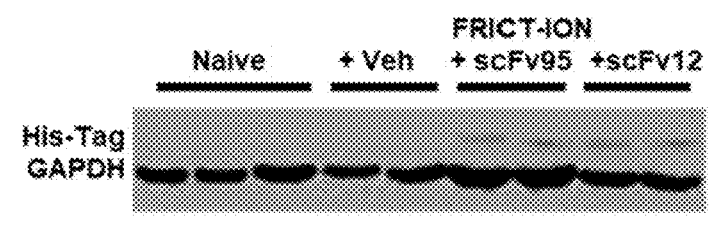
Figure 2:
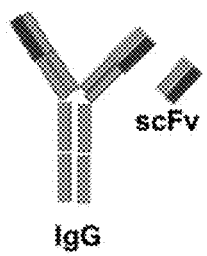
Figure 9:
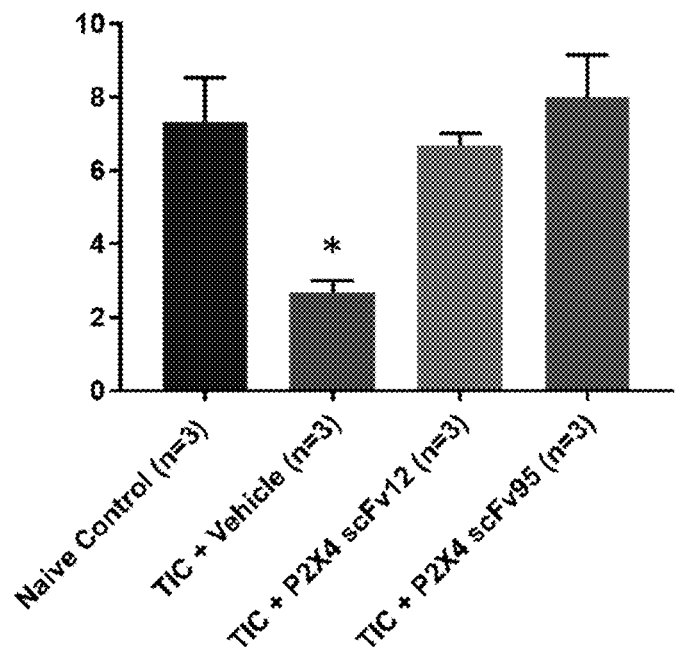
FIG. 9. P2X4 scFv antibodies (scFv12, scFv95) relieve depression behavior. Depression behavior is demonstrated in the mice with trigeminal neuropathic pain model (TIC) using the sucrose splash test in which grooming is initiated after 10% sucrose is misted on the back naïve mice. Grooming behavior was significantly reduced by the TIC model mice receiving neutral buffer vehicle (PBS), but was similar to untreated control in TIC mice receiving either scFv12 and scFv95. n=3, *p<0.05 ANOVA.
Figure 10:
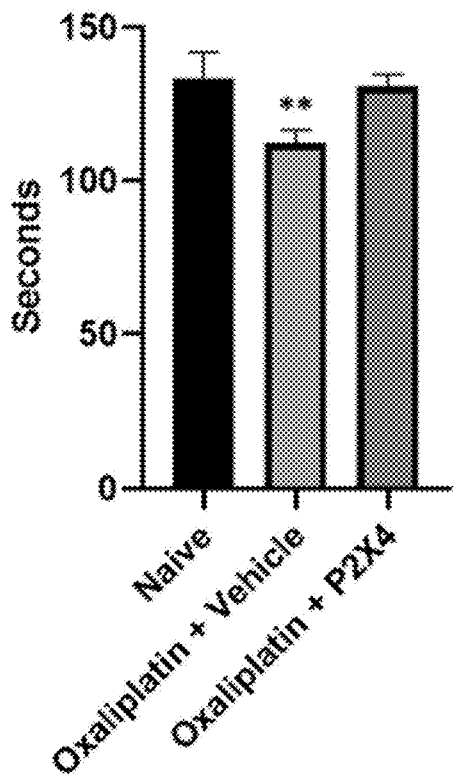
FIG. 10. Cold hypersensitivity (10° C.) develops in mice with chemotherapy drug oxaliplatin induced chemotoxic neuropathic pain, tested on a cold plate apparatus. The P2X4R scFv normalized the response to cold. **=p<0.01 compared to naïve; n=4.
Figure 11:
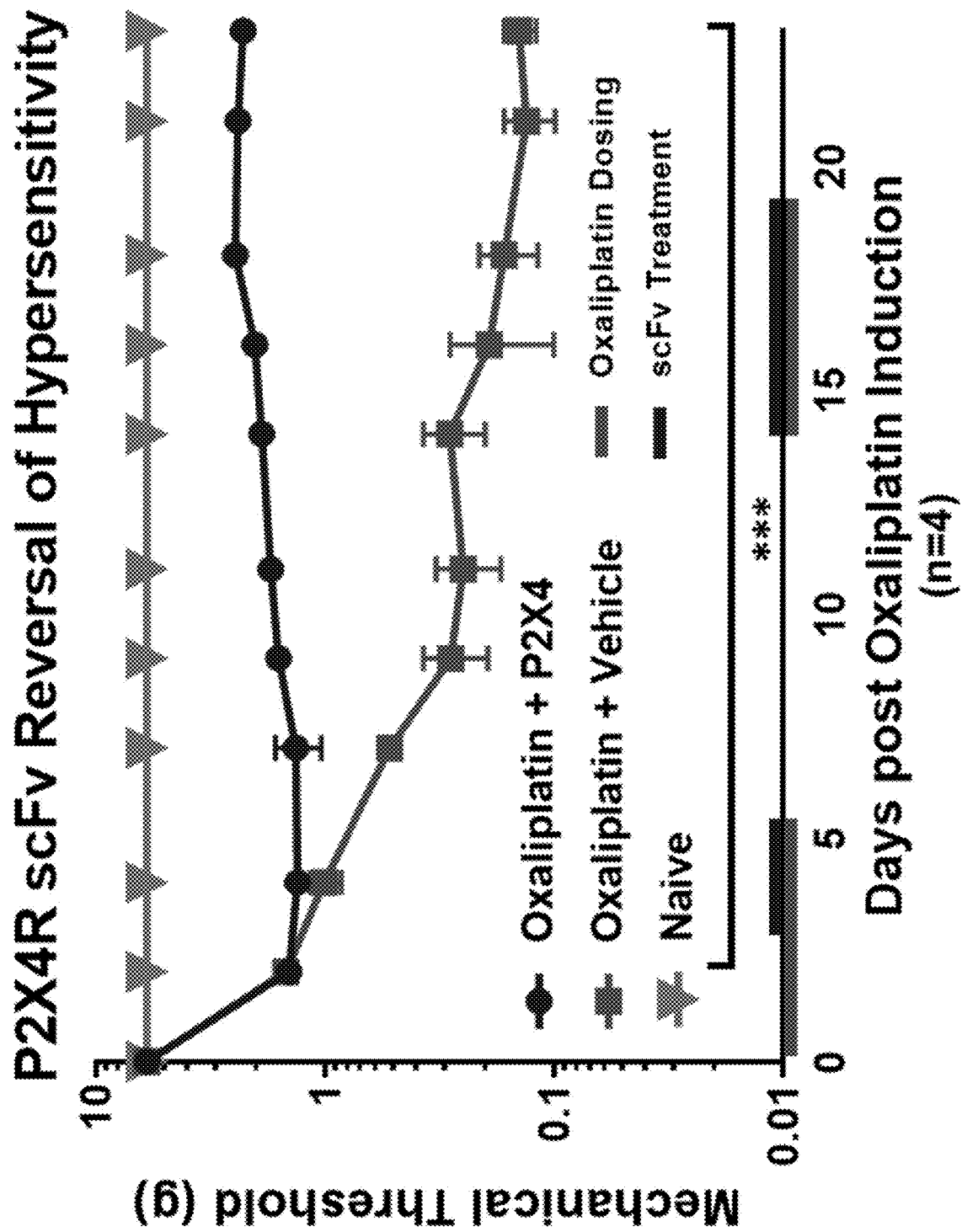
FIG. 11. Oxaliplatin (3 mg/kg, i.p.) was given on Days 1-5 to initiate chemotoxic neuropathic pain hypersensitivity. Treatment on Day 3 with the P2X4R scFv95 antibody halted further development of oxaliplatin-induced mechanical hypersensitivity indicated by the decreasing mechanical threshold response to von Frey filament stimulation of the footpad.
Figure 12:
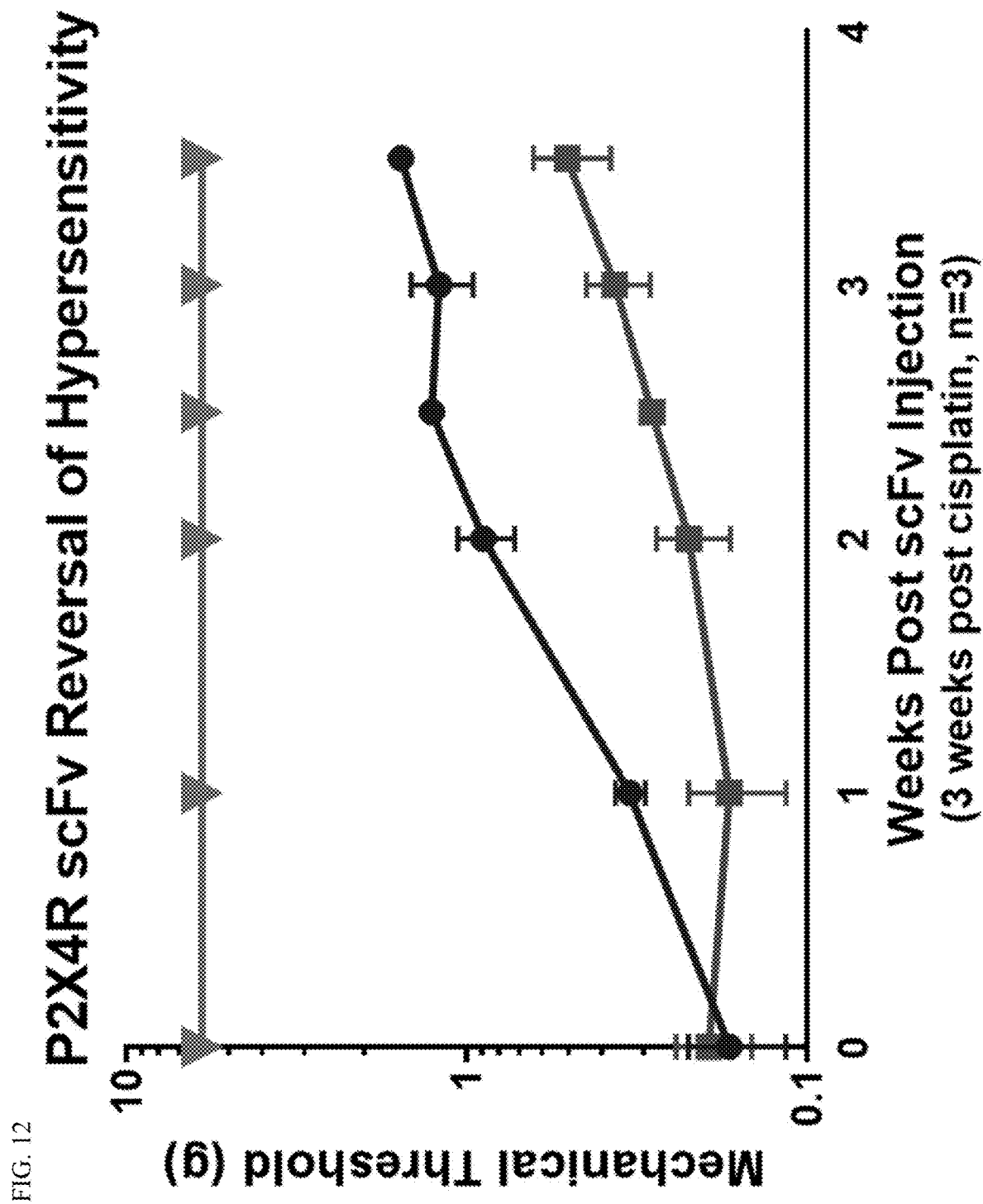
FIG. 12. P2X4R scFv95 provided an increased rate of recovery from established hypersensitivity initiated with chemotoxic cisplatin (1 mg/kg, i.p., days 1-7) three weeks prior.

Following sequencing, the coding regions encoding the anti-P2X4 scFvs were further cloned into the expression vector, pET32a. (FIG. 1A). The scFvs were expressed and purified from *E. coli* cytoplasm (FIG. 1B) as described previously for the generation of antibodies against the Zika virus and filovirus glycoproteins (Kunamneni et al., 2018, *PLoS ONE* 13(11):e0205743; Kunamneni et al., 2019, *Am. J. Trop. Med. Hyg.* 101(1):198-206), and CCK-B receptor (Kunamneni et al., 2019, *FASEB Journal*, April 2019, Abstract Number Ib31). Indirect ELISA assay revealed differential P2X4 peptide binding capability and specificity for three scFvs, with no reaction to the negative control anti-Zika scFv 7-2. The panning process was efficient in selecting clones of high affinity, as was evident from affinity differences of the scFvs: scFv95 and scFv12 had the highest and second highest affinities, respectively, while scFv103 had lower affinity (FIG. 2A). The two anti-P2X4 scFvs with the highest affinity (scFv12 and scFv95) were selected for in vivo behavior testing in a chronic trigeminal nerve injury model. Treatment with scFv12 and scFv95 reversed neuropathic pain hypersensitivity (FIG. 3, FIG. 11. FIG. 12), anxiety (FIG. 8), depression-like behavior (FIG. 9), and cold sensitivity (FIG. 10).

A combinatorial library of $V_H$ and $V_L$ genes can be generated by PCR using spleens from mice immunized with a biotinylated P2X4 peptide fragment. Selection of anti-P2X4 scFvs can be performed as follows: (1) The biotinylated P2X4 peptide "target" are immobilized on a streptavidin-coated polystyrene microtiter plate, and (2) coupled in vitro transcription/translation reactions are performed on the scFv library. Since these templates have the terminal stop codon removed, the protein ribosome complex will stall, thus retaining the mRNA. (3) These preformed tripartite antibody ribosome mRNA (ARM) complexes are then incubated in a "target"-coated microtiter plate. Only ARM complexes with an antibody that binds the target are retained; irrelevant ARM complexes are removed by washing. (4) After three rounds of selection, the retained antibody ARM complexes are recovered by RT-PCR and variant sequence of the $V_H$ and $V_L$ determined. (5) Protein expression and analysis of the scFv antibodies. Putative genes encoding selected scFvs to the P2X4 peptide are subcloned into a plasmid (e.g., pET32) for cytoplasmic expression in ROSETTA-GAMI B(DE3) competent cells (Millipore Sigma, Burlington, MA). After expression, the scFvs are screened by an indirect ELISA (primary screening), purified using a 1 mL HisTrap HP column as previously described (Kunamneni et al., 2018, *PLoS ONE* 13(11):e0205743), and affinity determined by surface plasmon resonance (SPR) (secondary screening) to determine kinetic constants ($k_{on}$, and $k_{off}$) as previously described (Wassaf et al., 2006, *Anal Biochem* 351:241-253). Curve-fitting software provided by surface plasmon resonance generates estimates of the association and dissociation rates from which affinities can be calculated. The scFvs showing high reactivity to that of the P2X4 positive control are further analyzed for cross-reactivity against P2X1-3, P2X5, and P2X7 receptor proteins as a final check of specificity. Lead scFv antibodies against the initial immunizing P2X4 peptide fragment from the secondary screening are tested as described below as pain therapy in the sciatic nerve, spared nerve ligation, and trigeminal nerve injury models.

A screened scFv can be modified to include a fluorescent tag for, for example, histological analysis. For example, red RFP1 fluorescent tag allows histological examination of an scFv and can potentially allow in vivo IVIS visualization in mice. Methods for producing fluorescently-labeled antibodies and fluorescently-labeled antibody fragments are described in, for example, U.S. Pat. No. 8,877,898.

One can evaluate the screened anti-P2X4 scFv antibodies for therapeutic value—e.g., to restore physiological and affective responses—in mice using pain models that mimic human chronic neuropathic pain conditions. One can immunize mice with induced sciatic or trigeminal neuropathic pain using the selected scFvs. Typical mouse models involve immunizing mice in week 3 (acute) and week 6 (chronic) to test reductions in pain and anxiety related behaviors. In the mouse model, pain experienced for six weeks is equivalent to eight human years and is considered chronic.

Sexual dimorphism of microglial P2X4 response has been demonstrated in previous acute models—i.e., block of P2X4 activation in male rodents is much more robust than for females who use T cell immune response.

Single dose scFv administration can be tested in blinded studies of sciatic and trigeminal nerve injury models at two time points. White BALB/c mice are selected since they remain cooperative for the 10 weeks of behavioral testing, although C57bl6 can also be used. In sham operations, the sciatic or infraorbital (ION) nerve is exposed but not compressed. P2X4 scFv antibodies are administered in week 3 or, in a separate cohort, in week 6 when anxiety-like and depression-like behaviors can be tested. Dose response is assessed in both male and female mice. Chronic studies include testing of female mice.

Figure 3:
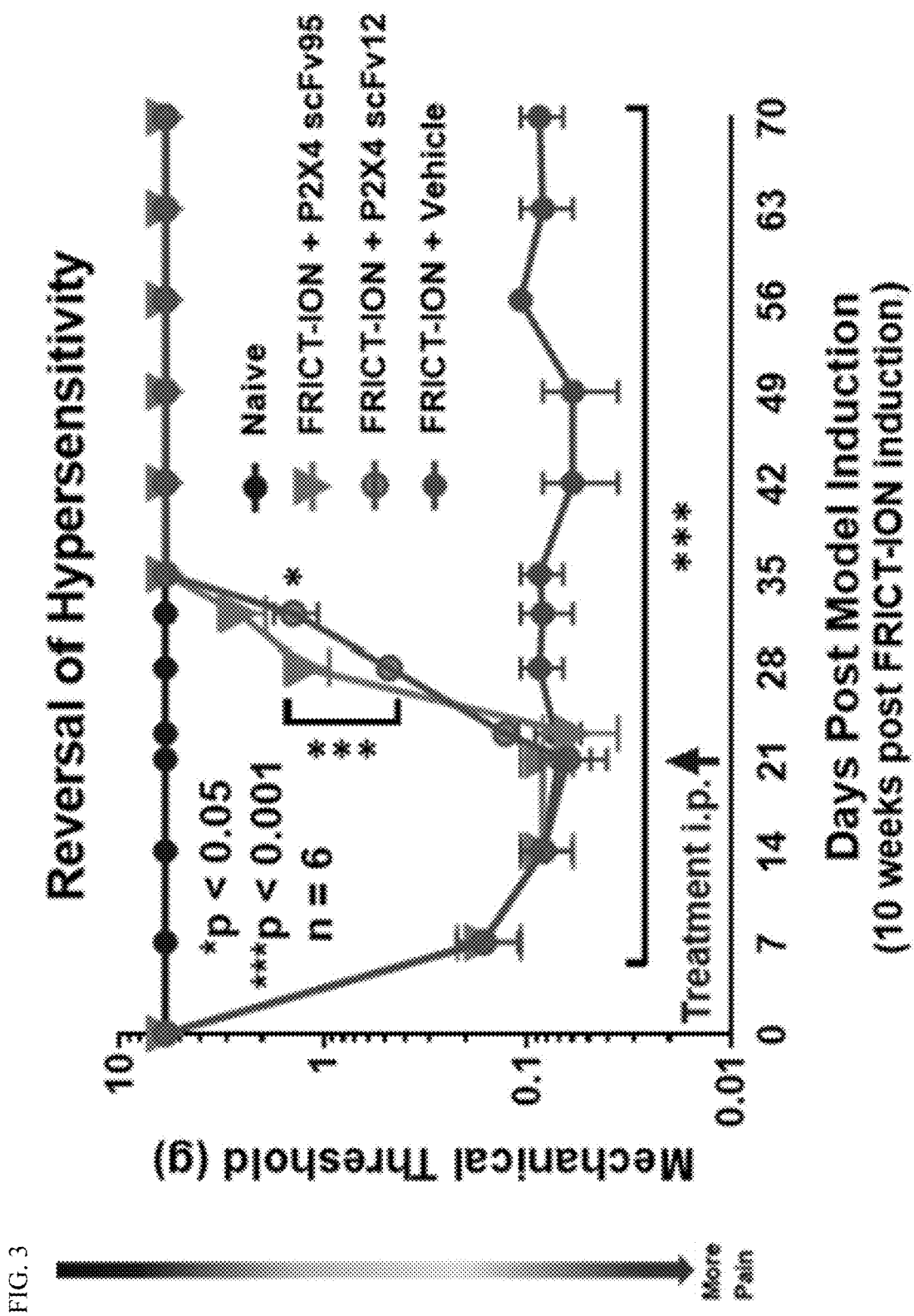
FIG. 3. Single intraperitoneal injection of anti-P2X4 scFv12 and scFv95 reverses chronic trigeminal neuropathic pain hypersensitivity (FRICT-ION model) (4 mg/kg) (n=6R). The decrease of the mechanical threshold indicates increasing pain-like behavior, and reversal of neuropathic pain hypersensitivity is indicated by full return of the mechanical threshold back to naïve baseline. The scFvs were given three weeks after surgical induction of the chronic FRICT-ION trigeminal nerve injury model when hypersensitivity was maximal. The single dose of either scFv lead returns the baseline level where it remains at least through 10 weeks. *$p<0.05$, ***$p<0.001$, n=6.
Figure 4:
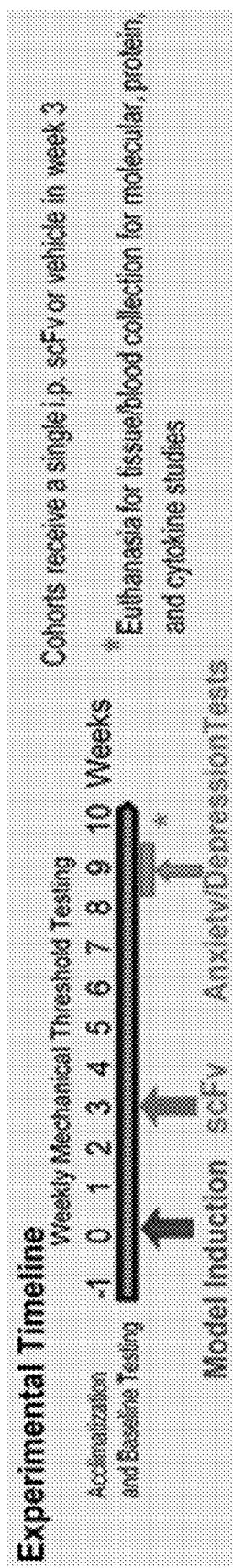
FIG. 4. Experimental timeline indicating weekly behavioral testing, surgical model induction and treatment timepoint. Treatment with scFv antibodies is by single intraperitoneal injection. * indicates experiment end.

The test dose response efficacy of scFv12 and scFv95 anti-P2X4 scFv antibodies were selected for testing in the sciatic nerve neuropathic pain model (CCI) (Mamet et al., 2014, *Pain* 155:322-333; Bennett, G J, and Xie, Y K, 1988, *Pain* 33:87-107) based on their high affinity. The sciatic nerve is exposed in animals anesthetized with isoflurane (3% induction and 2% maintenance). Three ligatures (4/0 silk, 1 mm between them) are tied around the sciatic nerve, taking caution to preserve epineural circulation. The sham-operated control mice undergo the same surgical procedure without nerve ligation. Naïve control mice remain untouched but undergo behavioral testing. A single intraperitoneal injection of vehicle or anti-P2X4-receptor scFv (0.04 mg/kg, 0.4 mg/kg, or 4.0 mg/kg (n=4)) is given three weeks post model induction. A decrease in the mechanical threshold indicates increasing pain-like behavior. Reversal of neuropathic pain hypersensitivity indicates return of the mechanical threshold back to naïve baseline. A single 0.4 mg/kg dose of scFv95 or scFv12 effectively returns the mechanical threshold and to naïve baseline for weeks (FIG. 3).

The optimal dose of anti-P2X4 scFv can be determined using the acute spared nerve neuropathic (SNL) pain model (Decosterd, I. and Woolf, C J, 2000, *Pain,* 87:149-158; Shields et al., 2003, *J Pain,* 4(8):465-470).

The efficacy of anti-P2X4 scFv for treating acute pain can be tested in the acute trigeminal neuropathic pain model (TIC) (Ma et al., 2012, *Neuroscience* 300:493-507; Lyons et al., 2018, *Clin J Pain* 34(2):168-177). Mechanical hypersensitivity (FIG. 11, FIG. 12) and cold hypersensitivity (FIG. 10) are reduced in this model.

The efficacy and optimal dose of anti-P2X4 scFv for treating chronic pain can be tested in the chronic spared nerve neuropathic pain model. Anti-P2X4 scFv is given in week 6 (n=4) to determine efficacy for reducing footpad hypersensitivity after long standing chronic neuropathic pain. Cognitive dependent memory, anxiety-like and depression-like behaviors, cognitive ability, and/or motor coordination can be tested in this chronic pain model.

The efficacy of anti-P2X4 scFv for treating chronic pain also can be tested in the chronic trigeminal nerve neuropathic pain model (Week 6). In this model, the anti-P2X4 scFvs can be tested for efficacy in reducing chronic trigeminal neuropathic pain by evaluating cognitive-dependent memory, anxiety-like and depression-like behaviors, cognitive ability, and/or motor coordination.

Hypersensitivity persists indefinitely in the SNL and TIC models. Thus, these models are suitable for assessing pain-like responses equivalent to the timeframe of chronic clinical pain. Reflexive pain responses to non-painful mechanical (von Frey) or heat/cold stimuli can be tested weekly on the foot or whisker pad in comparisons to controls. Responses to decreased gram force filaments or heat/cold compared to controls indicate increased hypersensitivity.

Figure 8:
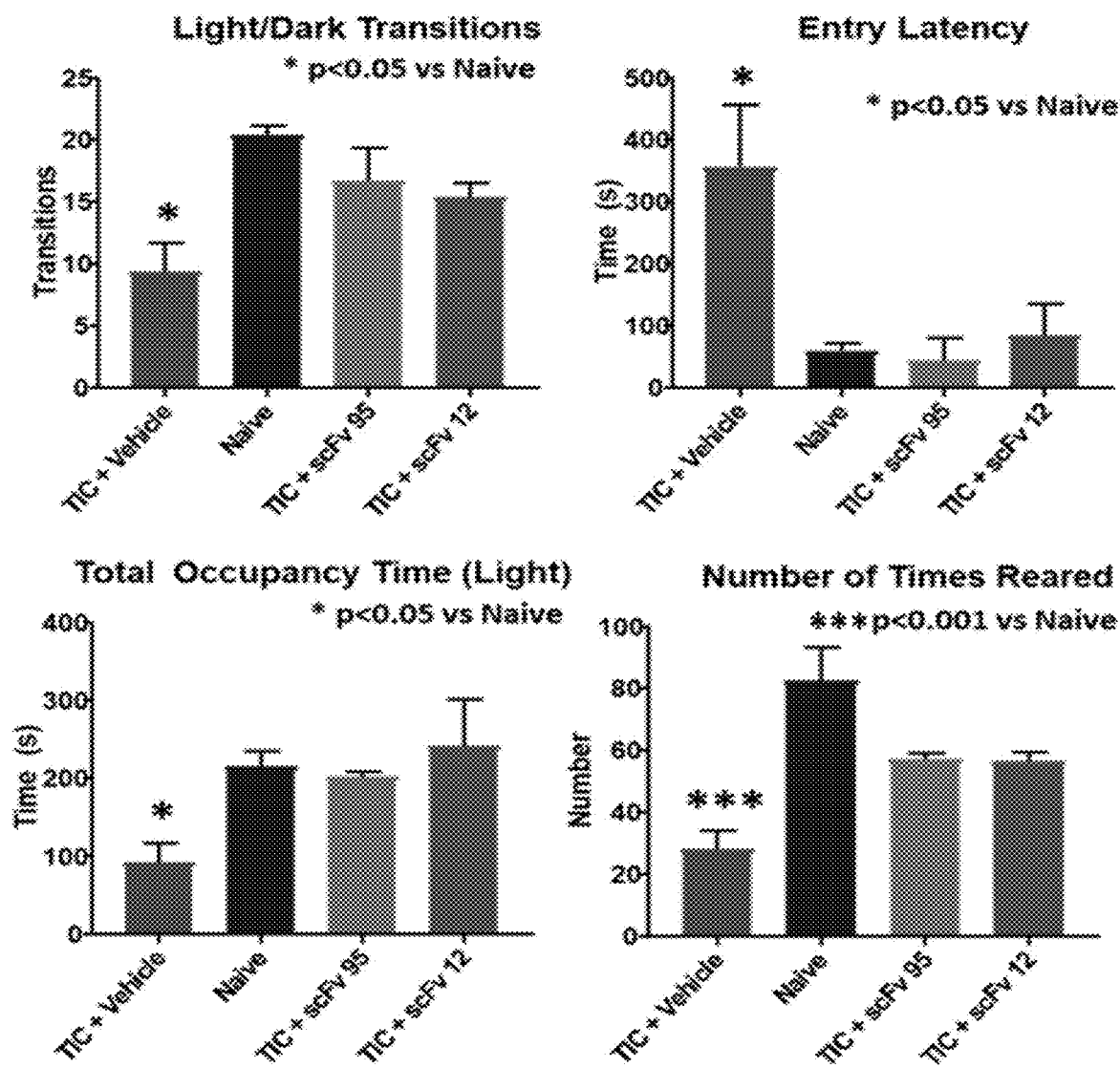
FIG. 8. P2X4 scFv antibody relieves anxiety behavior. Anxiety behavior is demonstrated in the mice with trigeminal neuropathic pain model (TIC) using the light-dark place preference test. Anxiety behavior was significantly reduced by scFv 12 and scFv 95 tested compared to PBS n=3, *p<0.05, ***p<0.001, ANOVA.

Cognitive-dependent behaviors are quantified in week 8-10 in the chronic models. Quantified behaviors are monitored by computer linked video recording. In the light/dark place preference test, collected variables in this two chamber test include time spent in each chamber, number of transitions between chambers, number of rearing events, entry latency into the light chamber, and/or latency of first re-entry (transition) back into the dark chamber. Anxiety behavior was significantly greater in neuropathic pain model mice that did not receive P2X4 scFv antibody (FIG. 8). In the zero maze test, fear/anxiety-like behavior is determined by the number of open and closed entries, the total open and closed area occupancy, and/or the number of exploratory rearing events. High anxiety states are directly related to open area avoidance.

Depression-like behavior is tested with the sucrose splash test, where measurement of decreased grooming behavior is a symptom of depression. Frequency, duration, and latency of grooming are scored after spraying a 10% sucrose solution (~250 µl) on the base of the tail. Grooming time after sucrose splash test was increased significantly after administering scFv12 and scFv95 (FIG. 9).

Capacity for learning and memory is tested using the novel object recognition test (Madathil et al., 2013, *PLoS ONE* 8(6):e67204). On the test day, animals are acclimated to for one hour prior to placing two identical Lego mini-figures in the cage for five minutes. The animal is returned to the test cage four hours later and one original figure is replaced with a novel object. Time spent exploring the objects is recorded.

Open-field activity monitors effects of scFvs on exploratory behavior, locomotion, stereotypic activity, and time-spent in pre-defined zones. To assess sedative or stimulant properties, motor coordination, balance, muscle strength, and gait are tested with the rotarod.

To study how the P2X4 scFv therapy modulates pain sensitivity, dorsal root ganglia, trigeminal ganglia, and slice preparations are harvested from mice used in the SNL and TIC nerve injury models after completion of those studies. Defined-medium spinal organotypic cultures are used to evaluate chronic effects of P2X4-specific scFvs on nociceptive circuitry using $Ca^{2+}$ imaging and electrophysiological approaches. Direct effects of dorsal root ganglia primary cultures and trigeminal ganglia primary cultures can be evaluated by inhibiting P2X4 activity with the scFv in vitro. Finally, in vitro recording of dorsal root ganglia neurons and trigeminal ganglia neurons of GCaMP mice (The Jackson Laboratory, Bar harbor, ME) are evaluated. In all cases, responses in scFv-treated mice to vehicle-treated mice are evaluated.

For example, one can evaluate electrophysiology recording of activation responses (i.e., capsaicin-evoked patch clamp recordings) in superficial medullary and spinal dorsal horn neurons from acutely isolated spinal cord slices. P2X4 is expressed in dorsal horn microglia, which, release inflammatory mediators when activated. One can characterize the effects on specific neuronal firing pattern subtypes of dorsal horn neurons as either putative excitatory (mainly delay neurons affecting neuronal responses) or inhibitory (mainly tonic neurons) neurons. This will provide a better understanding of the involvement of P2X4 in setting neuronal excitability in the dorsal horn. Intrinsic firing properties of these neurons and synaptic transmission in the dorsal horn also can be studied by measuring the amplitude and frequency of spontaneous excitatory postsynaptic currents (sEPSCs) and/or properties of dorsal root-evoked excitatory postsynaptic currents (eEPSCs), as previously described. (Alles et al., 2017, *Neuropharmacology* 113:576-590; Alles, S R A and Smith, P A, 2019, *Neuroscience Letters* 694:148-153.

If pain-related behavior is reduced by P2X4 scFv, serum cytokines and P2X4 also may be reduced. One can compare serum cytokines, P2X4 protein expression, and/or RNA expression changes in mice with and without the scFv treatment. Blood collected from the heart at euthanasia can be assayed as previously described (Ma et al., 2015). Spinal cord, dorsal root ganglia, and/or trigeminal ganglia P2X4 protein can be assessed by, for example, Western blot. Alternatively, or additionally, the effect of reduced cytokines on RNA expression can be assessed. RNA from dorsal root ganglia and trigeminal ganglia can be isolated after (e.g., nine weeks post-treatment) mice are treated with anti-P2X4 scFv, where the mice are treated with the anti-P2X4 scFv after (e.g., six weeks after) induction of the model, to assess changes in transcription.

Figure 5:
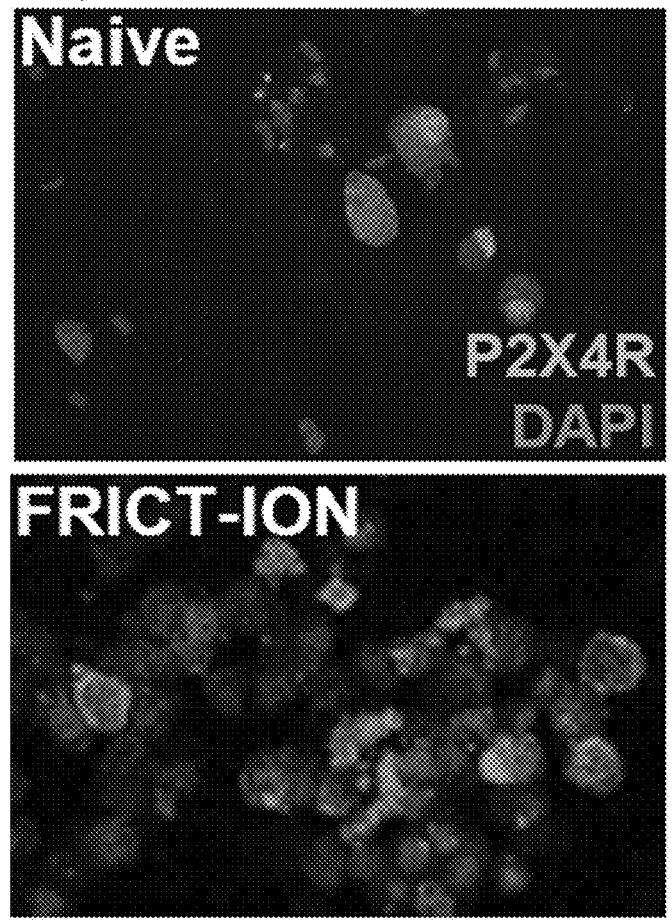
FIG. 5. Localization of P2X4 on trigeminal nerve cells isolated from animals with and without nerve injury induced hypersensitivity. Trigeminal peripheral nerve cells (TG) from naïve mice have a low expression of P2X4 receptor (P2X4R). DAPI staining indicates all cells present in the isolated cell culture. After induction of the trigeminal nerve injury (FRICT-ION), the P2X4R expression is significantly increased after seven weeks of ongoing pain-like hypersensitivity. $p<0.005$, n=3.
Figure 5:
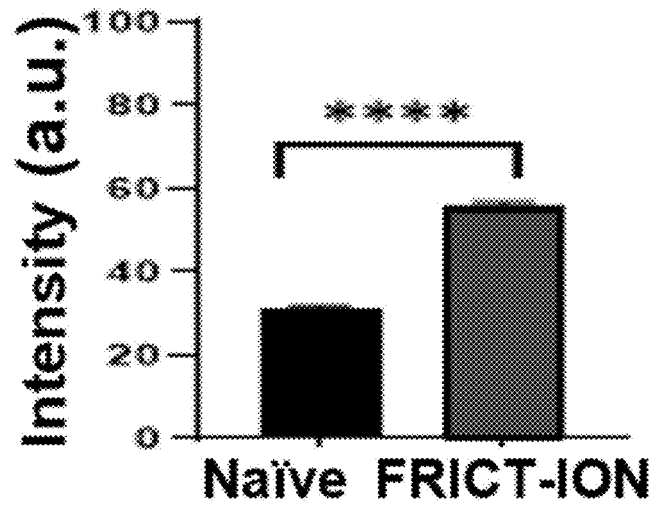
Figure 6:
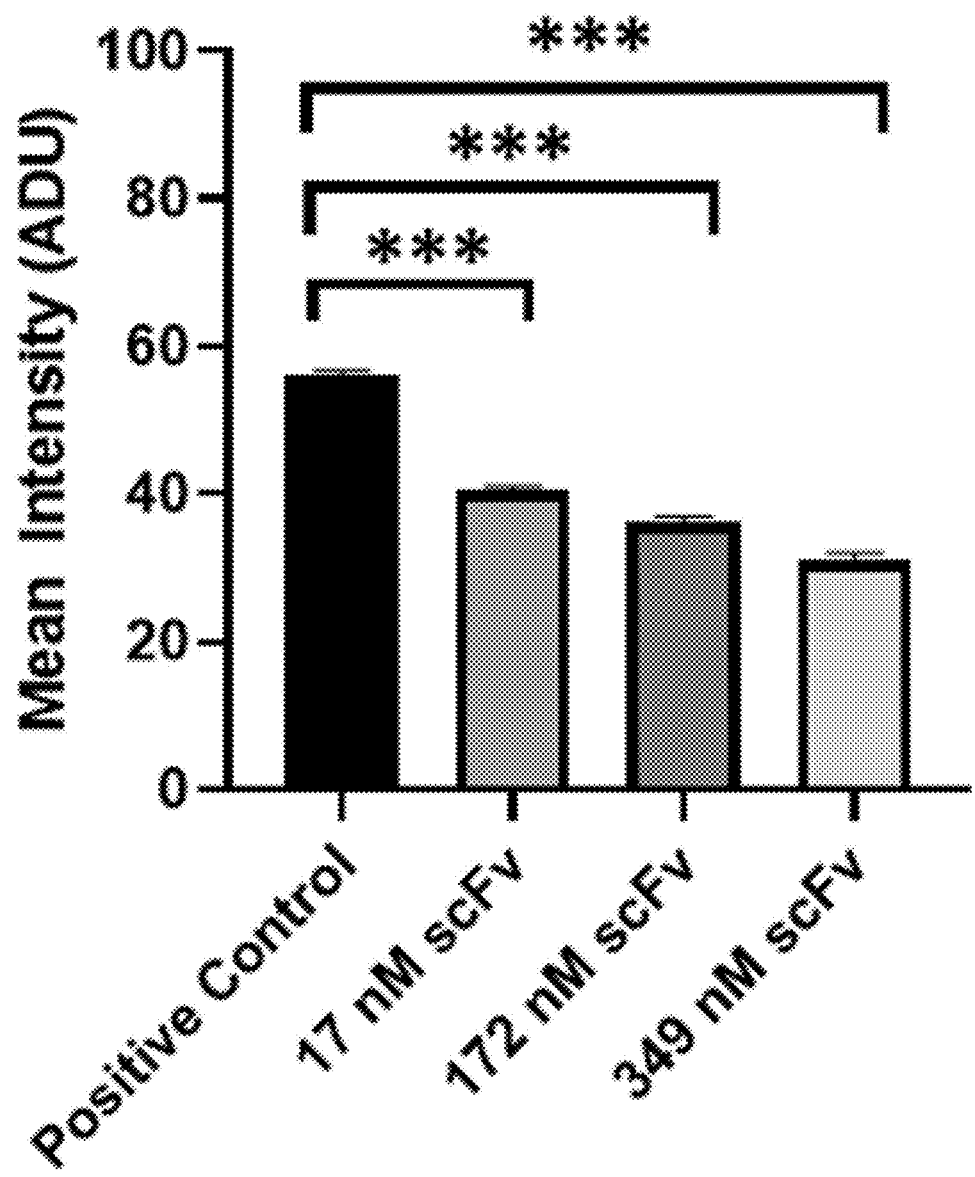
FIG. 6. P2X4 scFv 12 dose dependently blocks binding of commercial P2X4 antibody to P2X4 on trigeminal peripheral nerve cells (TG) prior to immunizing the TG to visualize P2X4. Dose dependent adsorption block of the P2X4 receptor on the trigeminal peripheral nerve cells (TG) by the P2X4R scFvs prior to immunostaining the TG to visualize the P2X4R. This block of the stain demonstrates the specificity of binding and the presence of the P2X4 receptor on the nerves upregulated when they are isolated from animals with nerve injury (FRICT-ION) induced hypersensitivity. *** indicates significant difference compared to Positive Control animals; $p<0.001$, n=3.

FIG. 5 shows localization of P2X4 trigeminal peripheral nerve cells have a low concentration of P2X4. after induction of trigeminal nerve injury, the P2X4 expression is significantly increased. Anti-P2X4 scFv12 inhibits binding of a commercial P2X4 antibody to these isolated neurons in a dose-dependent manner (FIG. 6).

Figure 13:
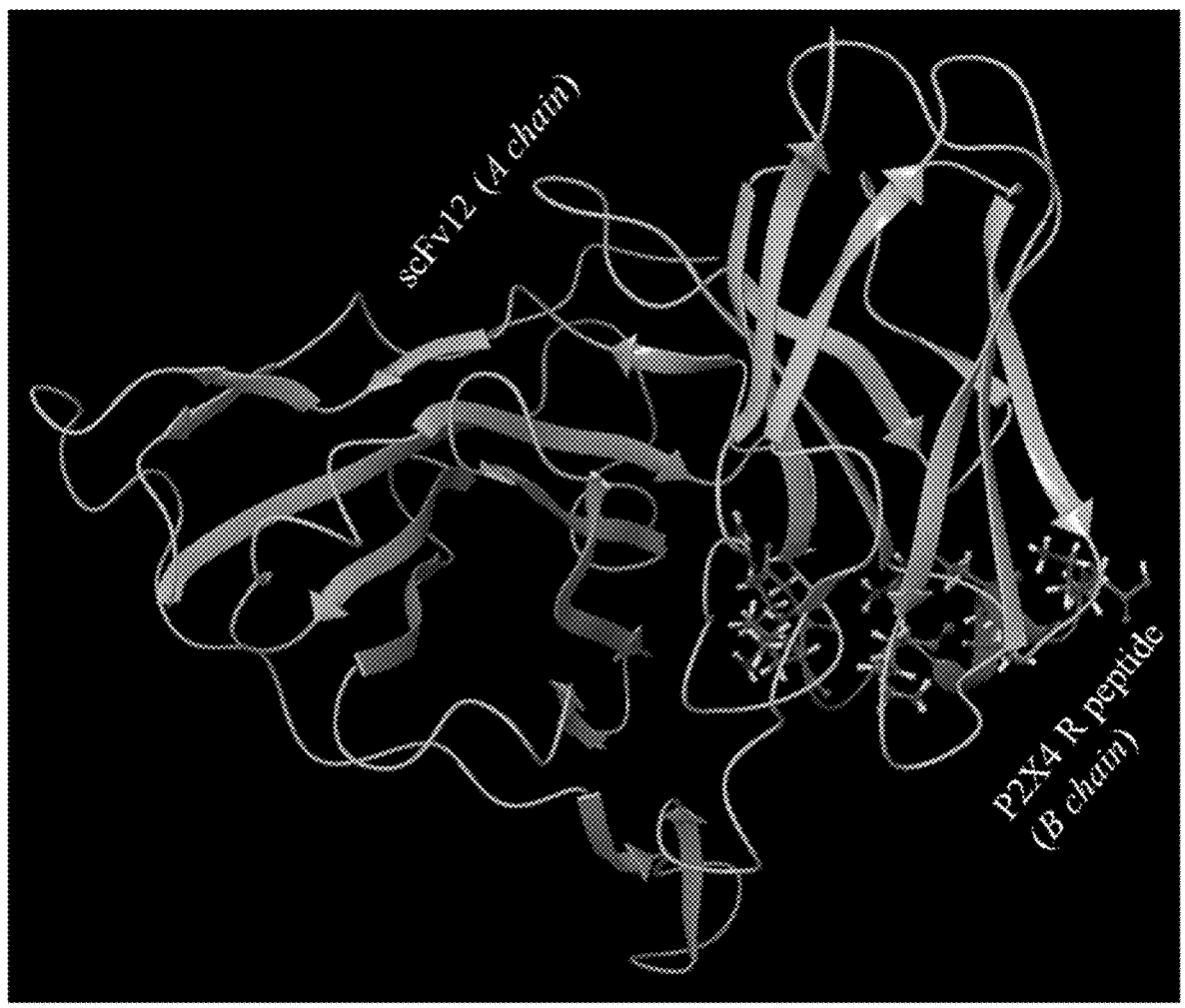
FIG. 13. Interaction of scFv12 with P2X4R. Amino acid side chain residue complements form the interface of P2X4R with scFv12 CDR.
Figure 14:
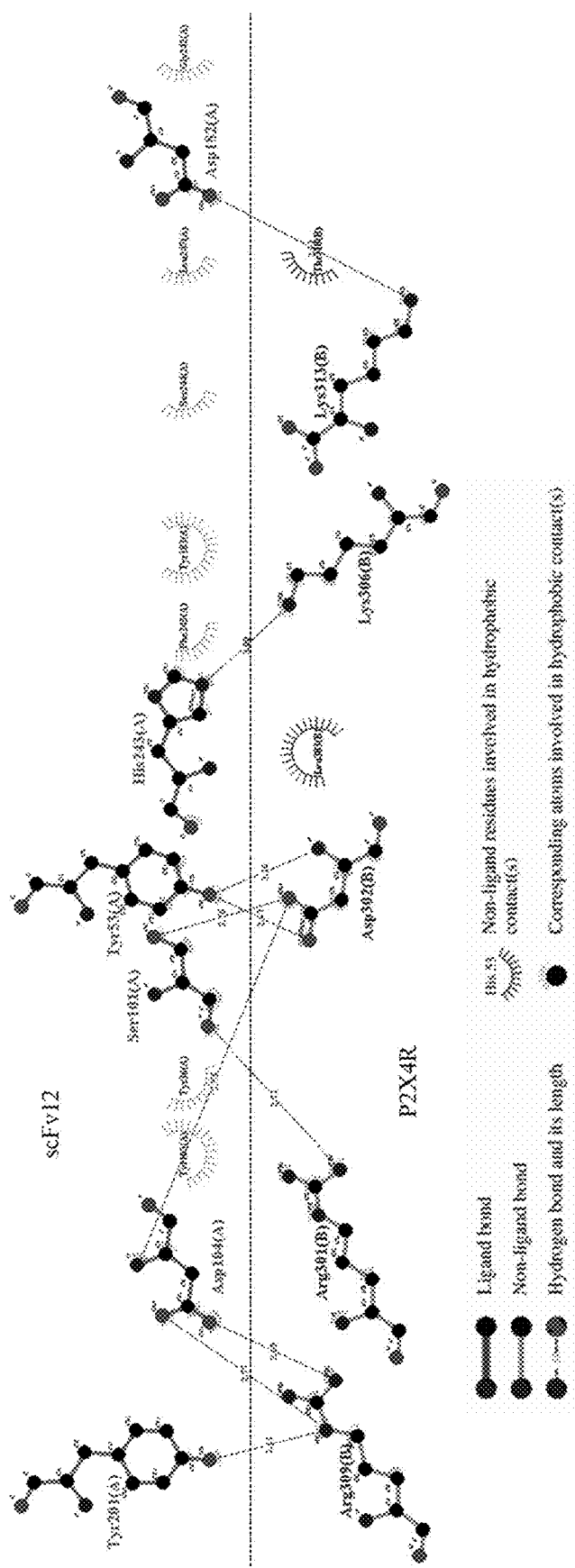
FIG. 14. Interaction of scFv12 with P2X4R. Two-dimensional diagram of the interaction between P2X4R and scFv12 using LIGPLOT software (Wallace et al., 1996. *Protein Eng* 8:127-134). The two-dimensional map shows the individual relationship of each interacting amino acid side chain. Close proximity indicates hydrophobic/Van der Waals associations. Doted lines indicate electrostatic bonds. Amino acid residues are colored according to hydrophobicity, charge, and polarity. Dark green: hydrophobic; cyan: polar uncharged; blue: positively charged; red: negatively charged; purple: purine; and sienna:pyrimidine.
Figure 15:
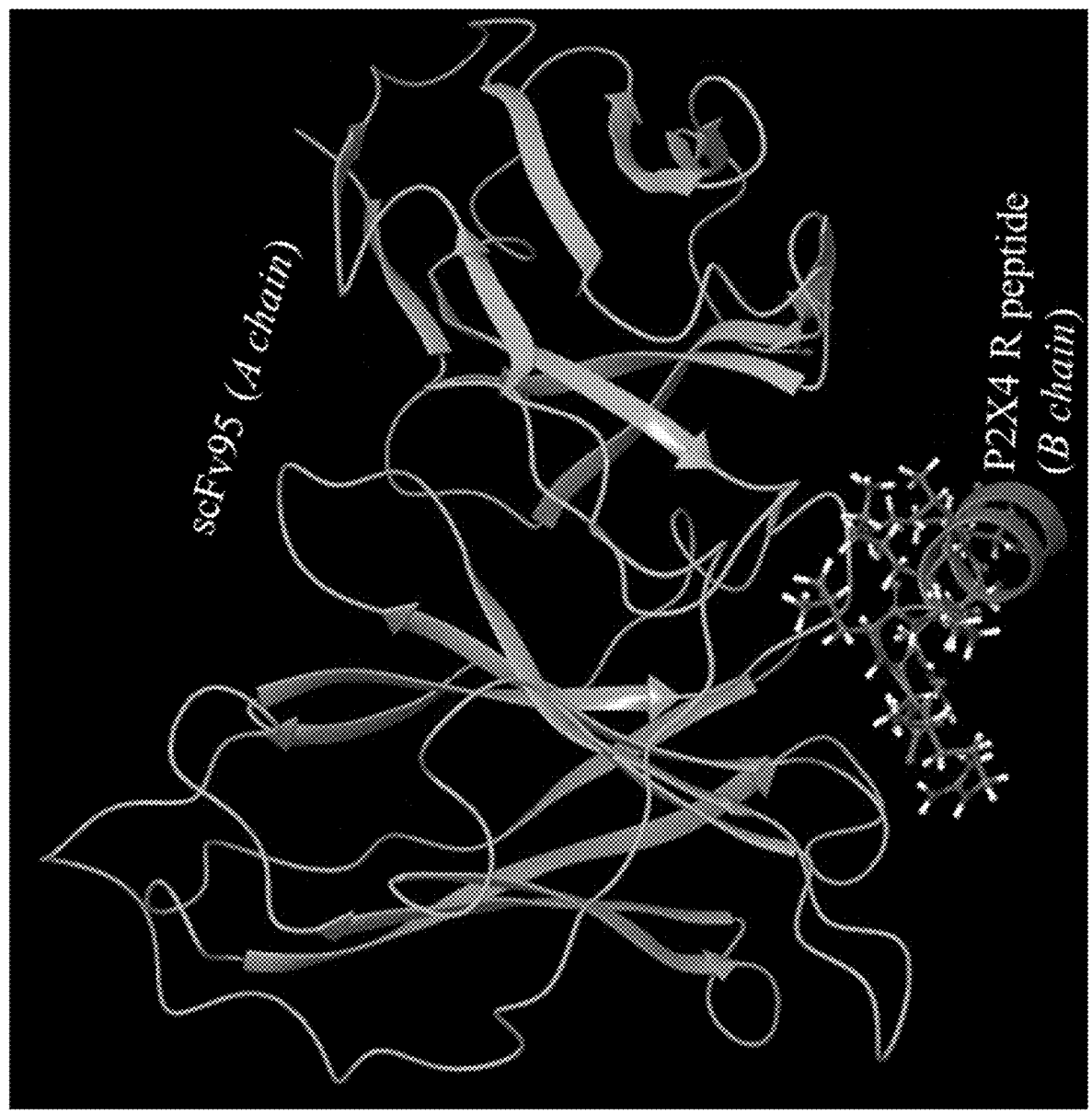
FIG. 15. The interaction of scFv95 with rat P2X4R peptide. Amino acid side chain residues complements form the interface P2X4R with scFv95 CDR.
Figure 16:
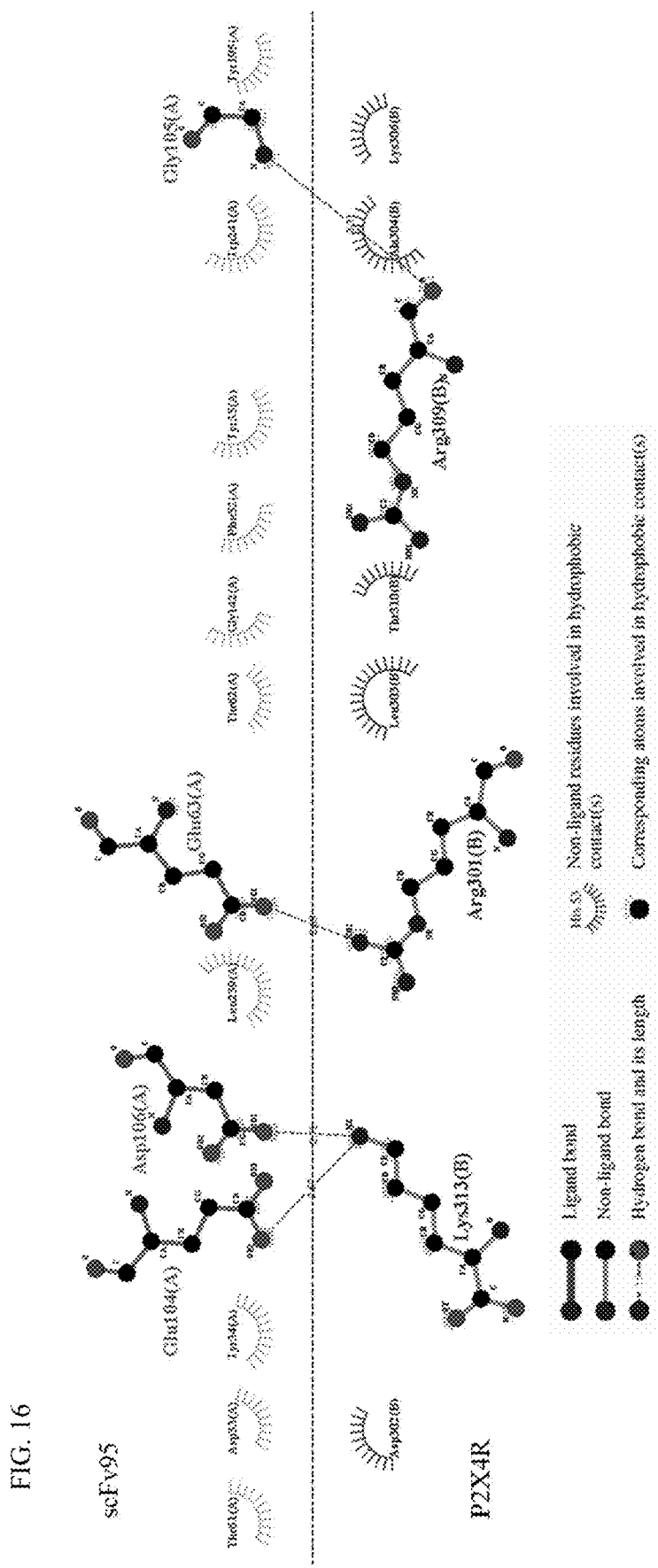
FIG. 16. The interaction of scFv95 with rat P2X4R peptide. Two-dimensional diagram of the interaction between P2X4R and scFv95 using LIGPLOT software (Wallace et al., 1996. *Protein Eng* 8:127-134). The two-dimensional map shows individual relationship of each interacting amino acid side chain. Close proximity indicates hydrophobic/Van der Waals associations. Dotted lines indicate electrostatic bonds.

FIG. 13 and FIG. 14 present computational modeling that identifies potential binding of scFv12 (SEQ ID NO:1) and scFv95 (SEQ ID NO:2) with rat P2X4R. The scFv12-P2X4 docked complexes were subjected to a single 100 ns molecular dynamics (MD) simulation that produced a docking prediction with sufficiently large and highly stable interface with scFv12 (SEQ ID NO:1) amino acid residues Tyr36, Tyr53, Ser101, Tyr103, Asp104, Asp182, Tyr183, Tyr201, Gly242, His243, Ser244, Phe245, and Leu247, forming charged interactions with Arg301, Asp302, Lys306, Arg309, and Lys313 of P2X4. scFv12 (SEQ ID NO:1) amino acid residues Tyr183, Asp57, and Asp104 formed electrostatic/aromatic/hydrophobic interactions with P2X4 counterparts. The computational modeling identified CDRs of scFv12 at amino acids 28-35, amino acids 56-58, amino acids 102-112, amino acids 177-183, amino acids 201-203, and amino acids 242-247 of SEQ ID NO:1.

The scFv95-P2X4 docked complexes also were subjected to a single 100 ns molecular dynamics (MD) simulation that produced a docking prediction with sufficiently large and highly stable interface with scFv95 (SEQ ID NO:2) amino acid residues Asp33, Tyr34, Thr61, Glu63, and Glu104, forming charged interactions with Arg301, Arg309, and Lys313 of P2X4. scFv95 (SEQ ID NO:2) amino acid residues Glu63, Glu104, and Asp106 formed electrostatic/aromatic/hydrophobic interactions with P2X4 counterparts. The computational modeling identified CDRs of scFv95 at amino acids 28-34, amino acids 55-60, amino acids 104-112, amino acids 171-177, amino acids 195-197, and amino acids 236-241 of SEQ ID NO:2.

Thus, this disclosure describes compositions and methods useful for non-opioid pain management. Generally, the composition includes an antibody that specifically binds to a P2X family receptor involved in acute and/or chronic pain (e.g., P2X4). The antibody may be prepared in a pharmaceutical composition.

The pharmaceutical composition may be formulated with a pharmaceutically acceptable carrier. As used herein, "carrier" includes any solvent, dispersion medium, vehicle, coating, diluent, antibacterial, and/or antifungal agent, isotonic agent, absorption delaying agent, buffer, carrier solution, suspension, colloid, and the like. The use of such media and/or agents for pharmaceutical active substances is well known in the art. Except insofar as any conventional media or agent is incompatible with the active ingredient, its use in the therapeutic compositions is contemplated. Supplementary active ingredients also can be incorporated into the compositions. As used herein, "pharmaceutically acceptable" refers to a material that is not biologically or otherwise undesirable, i.e., the material may be administered to an individual along with antibody without causing any undesirable biological effects or interacting in a deleterious manner with any of the other components of the pharmaceutical composition in which it is contained.

The therapeutic antibody may therefore be formulated into a pharmaceutical composition. The pharmaceutical composition may be formulated in a variety of forms adapted to a preferred route of administration. Thus, a composition can be administered via known routes including, for example, oral, parenteral (e.g., intradermal, transcutaneous, subcutaneous, intramuscular, intravenous, intraperitoneal, etc.), or topical (e.g., intranasal, intrapulmonary, intramammary, intravaginal, intrauterine, intradermal, transcutaneous, rectally, etc.). A pharmaceutical composition can be administered to a mucosal surface, such as by administration to, for example, the nasal or respiratory mucosa (e.g., by spray or aerosol). A composition also can be administered via a sustained or delayed release.

Thus, the antibody may be provided in any suitable form including but not limited to a solution, a suspension, an emulsion, a spray, an aerosol, or any form of mixture. The composition may be delivered in formulation with any pharmaceutically acceptable excipient, carrier, or vehicle. For example, the formulation may be delivered in a conventional topical dosage form such as, for example, a cream, an ointment, an aerosol formulation, a non-aerosol spray, a gel, a lotion, and the like. The formulation may further include one or more additives including such as, for example, an adjuvant, a skin penetration enhancer, a colorant, a fragrance, a flavoring, a moisturizer, a thickener, and the like.

A formulation may be conveniently presented in unit dosage form and may be prepared by methods well known in the art of pharmacy. Methods of preparing a composition with a pharmaceutically acceptable carrier include the step of bringing the antibody into association with a carrier that constitutes one or more accessory ingredients. In general, a formulation may be prepared by uniformly and/or intimately bringing the active compound into association with a liquid carrier, a finely divided solid carrier, or both, and then, if necessary, shaping the product into the desired formulations.

The amount of antibody administered can vary depending on various factors including, but not limited to, the specific antibody or antibody fragment being administered, the weight, physical condition, and/or age of the subject, and/or the route of administration. Thus, the absolute weight of antibody included in a given unit dosage form can vary widely, and depends upon factors such as the species, age, weight and physical condition of the subject, and/or the method of administration. Accordingly, it is not practical to set forth generally the amount that constitutes an amount of antibody effective for all possible applications. Those of ordinary skill in the art, however, can readily determine the appropriate amount with due consideration of such factors.

In some embodiments, the method can include administering sufficient antibody to provide a dose of, for example, from about 100 ng/kg to about 50 mg/kg to the subject, although in some embodiments the methods may be performed by administering antibody in a dose outside this range. In some of these embodiments, the method includes administering sufficient antibody to provide a dose of from about 10 µg/kg to about 5 mg/kg to the subject, for example, a dose of from about 1 mg/kg to about 4 mg/kg.

Alternatively, the dose may be calculated using actual body weight obtained just prior to the beginning of a treatment course. For the dosages calculated in this way, body surface area ($m^2$) is calculated prior to the beginning of the treatment course using the Dubois method: $m^2$=(wt $kg^{0.425}$×height $cm^{0.725}$)×0.007184. In some embodiments, the method can include administering sufficient antibody to provide a dose of, for example, from about 0.01 mg/$m^2$ to about 10 mg/$m^2$.

In some embodiments, antibody may be administered, for example, from a single dose to multiple administrations per week, although in some embodiments the method can be performed by administering antibody at a frequency outside this range. When multiple administrations are used within a certain period, the amount of each administration may be the same or different. For example, a dose of 1 mg per day may be administered as a single administration of 1 mg, two 0.5 mg administrations, or as a first administration of 0.75 mg followed by a second administration of 0.25 mg. Also, when multiple administrations are used within a certain period, the interval between administrations may be the same or be different. In certain embodiments, antibody may be administered from about once per month to about five times per week.

This disclosure therefore describes compositions and methods of non-opioid pain management. Treatment with a single dose of P2X4 scFv antibody can reverse mechanical allodynia during transition to chronic pain (week 3) and/or reverse chronification of pain (week 6). Cognitive-dependent memory, anxiety-like and depression-like behaviors, and motor coordination tested in the chronic pain models are similar to control baseline. Return to naïve baseline may signify recovery of nerve function in P2X4-scFv-antibody-treated male mice. Moreover, recordings of trigeminal ganglia neurons, dorsal root ganglia neurons, and slice recordings from untreated mice with neuropathy have altered activation properties. The success of the single inoculating dose may reflect effective block of microglial release of cytokines. It is possible that upregulated T cell P2X4 may be sufficient in chronic group females so that the P2X4 scFv is effective.

In the preceding description and following claims, the term "and/or" means one or all of the listed elements or a combination of any two or more of the listed elements; the terms "comprises," "comprising," and variations thereof are to be construed as open ended—i.e., additional elements or steps are optional and may or may not be present; unless otherwise specified, "a," "an," "the," and "at least one" are used interchangeably and mean one or more than one; and the recitations of numerical ranges by endpoints include all numbers subsumed within that range (e.g., 1 to 5 includes 1, 1.5, 2, 2.75, 3, 3.80, 4, 5, etc.).

In the preceding description, particular embodiments may be described in isolation for clarity. Unless otherwise expressly specified that the features of a particular embodiment are incompatible with the features of another embodiment, certain embodiments can include a combination of compatible features described herein in connection with one or more embodiments.

For any method disclosed herein that includes discrete steps, the steps may be conducted in any feasible order. And, as appropriate, any combination of two or more steps may be conducted simultaneously.

The present invention is illustrated by the following examples. It is to be understood that the particular examples, materials, amounts, and procedures are to be interpreted broadly in accordance with the scope and spirit of the invention as set forth herein.

EXAMPLES

Example 1—Ribosome Display scFv that bind to P2X4 were generated through ribosome display, characterized, and validated as previously described (Kunamneni et al., 2018, *PLoS ONE* 13(11):e0205743; Kunamneni et al., 2019, *Am. J. Trop. Med. Hyg.* 101(1): 198-206) using a 13-amino-acid P2X4 peptide RDLAGKEQRTLTK (SEQ ID NO:3) biotinylated at the N terminal.

Example 2—Cell-Free Ribosome Display

A combinatorial library of $V_H$ and $V_L$ genes is generated by PCR from spleens of mice immunized five times at three week intervals with P2X4 receptor peptide fragment (13 aa, RDLAGKEQRTLTK (SEQ ID NO:3), N terminal biotinylated). Selection of anti-P2X4 scFv antibodies is illustrated in FIG. 7. The P2X4 peptide "target" (biotinylated) is used to coat the streptavidin plate. The coupled in vitro transcription/translation reactions are performed on the scFv antibody library. Since these templates have the terminal stop codon removed, the protein ribosome complex will stall, thus retaining the mRNA. The resulting preformed tripartite antibody ribosome mRNA (ARM) complexes are incubated in tubes coated with target peptide. After three rounds of selection, the retained antibody ARM complexes are recovered by RT-PCR (~750 bp). The enriched antibody genes are subcloned into pGEM T-Easy vector and transformed into X L1-Blue *Escherichia coli*. About 1000 white colonies are selected from the scFv library and 30% randomly chosen clones are sequenced to identify unique antibody clones and the $V_H$ and $V_L$ sequences are determined. Putative genes encoding selected anti-P2X4 scFvs are subcloned into a pET32a plasmid for cytoplasmic expression in *E. coli*. About 100 colonies are selected and screened for the presence of anti-P2X4-specific scFvs with an indirect ELISA using an optical density-based screening method of crude lysates (primary screening). Selection of scFv candidates is based on the ratio of the scFv absorbance value to that of the positive control under similar conditions using the P2X4 receptor peptide ELISA Kit (MyBioSource, Inc., San Diego, CA). Finally, scFv candidates from the primary screening are expressed, purified, and the affinity is determined by surface plasmon resonance (SPR) microarrays (secondary screening) to determine kinetic constants ($k_{on}$ and $k_{off}$). Affinity ranking is defined as the ratio of the scFv $K_D$ value to that of the positive control under the same conditions.

Protein Expression, Purification, and Authentication of scFvs

P2X4 receptor scFv is expressed in the form of C-terminal 6×His fusion from the prokaryotic expression vector pET32a. The constructed pET32a plasmids are transfected into Rosetta gamiB(DE3) competent cells, expressed, and purified using 1 mL HisTrap HP columns (GE Healthcare). Binding of scFv antibodies to target P2X4 receptor is determined by Western blot and ELISA analyses. The scFv clones showing high reactivity are further analyzed for cross-reactivity against CCK and P2X family proteins. This is done in order to select P2X-specific scFvs with significant cross-reactivity to other P2X family receptors.

Computational Modeling

The advanced computational protocol used for determining interactions between scFv and rat P2X4R peptide involves several steps. I-TASSER analysis (Zhang, 2008. *BMC Bioinformatics* 9:40; Roy et al., 2010. *Nat Protocol* 5:725-728; Yang et al., 2015. *Nat Methods* 12:7-8; Yang et al., 2016. *Proteins* 84:233-246) was used to produce three-dimensional structure model of protein molecules from amino acid sequences. The predicted structural models are validated using high-resolution protein structure refinement (Zhu et al., 2014. *Proteins* 82(8):1646-1655; Schrödinger 2020-2, Schrödinger, Inc., New York, NY) ModRefiner (Xu, D. and Zhang, Y, 2011. *Biophys J* 101(10):2525-2534), and fragment-guided molecular dynamics (FG-MD) simulation (Zhang et al., 2011. *Structure* 19:1784-1795).

Molecular Docking

The refined models are docked according to the Fast Fourier Transform (FFT)-based program PIPER (Kozakov et al., 2006. *Proteins* 65(2):392-406). Docking results are validated using LIGPLOT (Wallace et al., 1996. *Protein Eng* 8:127-134). An interactive map identifies interactions such as hydrogen bonds, pi-pi interaction, side-chain bond, and backbone hydrogen bonds. Ligand-protein interaction maps also are used to predict the position and the interacting amino acids of the P2X4R scFv and the P2X4R protein.

Molecular Dynamics (MD) Simulations

Molecular dynamic stimulation studies for the selected docked models are performed using Desmond module of Schrödinger software (Schrödinger 2020-2; Schrödinger, Inc., New York, NY) with OPLS3 force field (Harder et al., 2016. *J Chem Theory Comput* 12(1):281-296). The protein-ligand complex is embedded into a POPC lipid bilayer in a predefined TIP3P water model (Jorgensen et al., 1983. *J Chem Phys* 79:926) in the orthorhombic box. The box volume is minimized and the overall system charge is neutralized by adding $Na^+$ or $Cl^-$ ions and 0.15 mM NaCl to construct near-physiological conditions. The temperature and pressure are kept constant throughout the simulation at 300 K and 1.01325 bar using Nose-Hoover thermostat (Hoover et al., 1985. *J Chem Phys* 83:4069) and Martyna-Tobias-Klein barostat (Martyna et al., 1994. *Mol Phys* 87:1117) methods. The simulations are performed for >100 ns using NPgammaT ensembles for proteins and membranes ensemble (Ikeguchi, 2004. *J Comput Chem* 25(4):529-41) considering number of atoms, pressure, and timescale. During simulations, the long-range electrostatic interactions are calculated using Particle-Mesh-Ewald method (Essmann et al., 1995. *J Chem Phys* 103:8577-8593) and whole ensemble is constructed as a rigid body packing (Ikeguchi, 2004. *J Comput Chem* 25(4):529-41) and relaxed gradually at 1.2 KiloJoules of energy during the simulations.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

```
Sequence Listing Free Text
scFv12
                                             SEQ ID NO: 1
MADVKLQESG PGLVKPSQSL SLTCSVTGYS ITSGYYWNWI

RQFPGNKLEW MGYISYDGSN NYNPSLKNRI SITRDTSKNQ

FFLKLNSVTT EDTATYYCAR SDYDLYYYAM DYWGQGTSVT

VSSAKTTPPS GGGGSGGGGS GGGGGSGGGG SDIVMTQSPA

TLSVTPGDRV SLSCRASQSI SDYLHWYQQK SHESPRLLIK

YASQSISGIP SRFSGSGSGS DFTLSINSVE PEDVGVYYCQ

NGHSFPLTFG SGTKLEIKRA DAAALE
CDRs: bold underline scFv95
                                             SEQ ID NO: 2
MAEVKLVESG GGLVQPGGSL RLSCATSGFT FTDYYMSWVR

QPPGKALEWL GFIRNKANGY TTEYSASVKG RFTISRDNSQ

SILYLQMNTL RAEDSATYYC ARWEGDLLYA MDYWGQGTSV

TVSSGGGGSG GGGSGGGGS GGGGSDIQMT QTTSSLSASL

GDRVTISCSA SQGISNYLNW YQQKPDGTVK LLIYYTSSLH

SGVPSRFSGS GSGTDYSLTI SNLEPEDIAT YYCQQYSKLP

WTFGGGTKLE IKRADAAALE
CDRs: bold underline

SEQ ID NO: 3
RDLAGKEQRT LTK
```

---

What is claimed is:

1. A composition comprising:
   an antibody or antibody fragment that specifically binds to a P2X family receptor, and a pharmaceutically acceptable carrier,
   wherein the P2X family receptor is P2X4, wherein the antibody comprises the CDRs comprising amino acids 28-35, amino acids 56-58, amino acids 102-112, amino acids 177-183, amino acids 201-203 and amino acids 242-247 of SEQ ID NO:1.

2. The composition of claim 1, wherein the antibody comprises a detectable marker.

3. The composition of claim 2, wherein the detectable marker comprises a fluorescent tag.

4. A composition comprising:
   an antibody or antibody fragment that specifically binds to a P2X family receptor, and a pharmaceutically acceptable carrier,
   wherein the P2X family receptor is P2X4, wherein the antibody comprises the CDRs comprising amino acids 28-34, amino acids 55-60, amino acids 104-112, amino acids 171-177, amino acids 195-197 and amino acids 236-241 of SEQ ID NO:2.

5. The composition of claim 4, wherein the antibody comprises a detectable marker.

6. The composition of claim 5, wherein the detectable marker comprises a fluorescent tag.

* * * * *

UNITED STATES PATENT AND TRADEMARK OFFICE
CERTIFICATE OF CORRECTION

PATENT NO. : 12,448,440 B2  
APPLICATION NO. : 17/637350  
DATED : October 21, 2025  
INVENTOR(S) : High et al.

Page 1 of 1

It is certified that error appears in the above-identified patent and that said Letters Patent is hereby corrected as shown below:

On the Title Page

Item (73), in "Assignees", in Column 1, Line 1, delete "LOYOTA" and insert --LOYOLA-- therefor Signed and Sealed this  
Ninth Day of December, 2025

John A. Squires  
*Director of the United States Patent and Trademark Office*

SEQUENCE LISTING

```
<160> NUMBER OF SEQ ID NOS: 3

<210> SEQ ID NO 1
<211> LENGTH: 266
<212> TYPE: PRT
<213> ORGANISM: artificial
<220> FEATURE:
<223> OTHER INFORMATION: scFv12

<400> SEQUENCE: 1

Met Ala Asp Val Lys Leu Gln Glu Ser Gly Pro Gly Leu Val Lys Pro
1               5                   10                  15

Ser Gln Ser Leu Ser Leu Thr Cys Ser Val Thr Gly Tyr Ser Ile Thr
            20                  25                  30
```

Ser Gly Tyr Tyr Trp Asn Trp Ile Arg Gln Phe Pro Gly Asn Lys Leu
            35                  40                  45

Glu Trp Met Gly Tyr Ile Ser Tyr Asp Gly Ser Asn Asn Tyr Asn Pro
 50                  55                  60

Ser Leu Lys Asn Arg Ile Ser Ile Thr Arg Asp Thr Ser Lys Asn Gln
 65                  70                  75                  80

Phe Phe Leu Lys Leu Asn Ser Val Thr Glu Asp Thr Ala Thr Tyr
                85                  90                  95

Tyr Cys Ala Arg Ser Asp Tyr Asp Leu Tyr Tyr Ala Met Asp Tyr
                100                 105                 110

Trp Gly Gln Gly Thr Ser Val Thr Val Ser Ser Ala Lys Thr Thr Pro
            115                 120                 125

Pro Ser Gly Gly Gly Ser Gly Gly Gly Ser Gly Gly Gly
            130                 135                 140

Gly Ser Gly Gly Gly Ser Asp Ile Val Met Thr Gln Ser Pro Ala
145                 150                 155                 160

Thr Leu Ser Val Thr Pro Gly Asp Arg Val Ser Leu Ser Cys Arg Ala
                165                 170                 175

Ser Gln Ser Ile Ser Asp Tyr Leu His Trp Tyr Gln Gly Lys Ser His
            180                 185                 190

Glu Ser Pro Arg Leu Leu Ile Lys Tyr Ala Ser Gln Ser Ile Ser Gly
            195                 200                 205

Ile Pro Ser Arg Phe Ser Gly Ser Gly Ser Asp Phe Thr Leu
        210                 215                 220

Ser Ile Asn Ser Val Glu Pro Glu Asp Val Gly Val Tyr Tyr Cys Gln
225                 230                 235                 240

Asn Gly His Ser Phe Pro Leu Thr Phe Gly Ser Gly Thr Lys Leu Glu
                245                 250                 255

Ile Lys Arg Ala Asp Ala Ala Ala Leu Glu
            260                 265

<210> SEQ ID NO 2
<211> LENGTH: 260
<212> TYPE: PRT
<213> ORGANISM: artificial
<220> FEATURE:
<223> OTHER INFORMATION: scFv95

<400> SEQUENCE: 2

Met Ala Glu Val Lys Leu Val Glu Ser Gly Gly Gly Leu Val Gln Pro
 1               5                  10                  15

Gly Gly Ser Leu Arg Leu Ser Cys Ala Thr Ser Gly Phe Thr Phe Thr
            20                  25                  30

Asp Tyr Tyr Met Ser Trp Val Arg Gln Pro Pro Gly Lys Ala Leu Glu
            35                  40                  45

Trp Leu Gly Phe Ile Arg Asn Lys Ala Asn Gly Tyr Thr Thr Glu Tyr
 50                  55                  60

Ser Ala Ser Val Lys Gly Arg Phe Thr Ile Ser Arg Asp Asn Ser Gln
65                   70                  75                  80

Ser Ile Leu Tyr Leu Gln Met Asn Thr Leu Arg Ala Glu Asp Ser Ala
                85                  90                  95

Thr Tyr Tyr Cys Ala Arg Trp Glu Gly Asp Leu Leu Tyr Ala Met Asp
                100                 105                 110

Tyr Trp Gly Gln Gly Thr Ser Val Thr Val Ser Ser Gly Gly Gly Gly
            115                 120                 125

```
Ser Gly Gly Gly Ser Gly Gly Gly Gly Ser Gly Gly Gly
    130             135             140

Ser Asp Ile Gln Met Thr Gln Thr Thr Ser Ser Leu Ser Ala Ser Leu
145             150             155             160

Gly Asp Arg Val Thr Ile Ser Cys Ser Ala Ser Gln Gly Ile Ser Asn
                165             170             175

Tyr Leu Asn Trp Tyr Gln Gln Lys Pro Asp Gly Thr Val Lys Leu Leu
            180             185             190

Ile Tyr Tyr Thr Ser Ser Leu His Ser Gly Val Pro Ser Arg Phe Ser
        195             200             205

Gly Ser Gly Ser Gly Thr Asp Tyr Ser Leu Thr Ile Ser Asn Leu Glu
    210             215             220

Pro Glu Asp Ile Ala Thr Tyr Tyr Cys Gln Gln Tyr Ser Lys Leu Pro
225             230             235             240

Trp Thr Phe Gly Gly Gly Thr Lys Leu Glu Ile Lys Arg Ala Asp Ala
            245             250             255

Ala Ala Leu Glu
            260

<210> SEQ ID NO 3
<211> LENGTH: 13
<212> TYPE: PRT
<213> ORGANISM: Rattus norvegicus

<400> SEQUENCE: 3

Arg Asp Leu Ala Gly Lys Glu Gln Arg Thr Leu Thr Lys
1               5                   10
```